(12) United States Patent
Licht et al.

(10) Patent No.: US 11,633,691 B2
(45) Date of Patent: Apr. 25, 2023

(54) APPARATUS, SYSTEM AND METHOD FOR DIRECT CAPTURE OF CARBON-CONTAINING GAS

(71) Applicant: Direct Air Capture, LLC, Venice, FL (US)

(72) Inventors: Stuart Licht, Venice, FL (US); Gad Licht, Venice, FL (US)

(73) Assignee: Direct Air Capture, LLC, Venice, FL (US)

(\*) Notice: Subject to any disclaimer, the term of this patent is extended or adjusted under 35 U.S.C. 154(b) by 0 days.

(21) Appl. No.: 17/729,737

(22) Filed: Apr. 26, 2022

(65) Prior Publication Data

US 2022/0355240 A1 Nov. 10, 2022

Related U.S. Application Data

(60) Provisional application No. 63/318,944, filed on Mar. 11, 2022, provisional application No. 63/305,544, filed on Feb. 1, 2022, provisional application No. 63/179,778, filed on Apr. 26, 2021.

(51) Int. Cl.
| | |
|---|---|
| B01D 53/02 | (2006.01) |
| B01D 53/14 | (2006.01) |
| C25B 9/09 | (2021.01) |
| B01D 53/62 | (2006.01) |
| C25B 1/135 | (2021.01) |
| C25B 1/02 | (2006.01) |

(52) U.S. Cl.
CPC ......... B01D 53/1475 (2013.01); B01D 53/62 (2013.01); C25B 9/09 (2021.01); B01D 2257/504 (2013.01); B01D 2258/06 (2013.01); C25B 1/02 (2013.01); C25B 1/135 (2021.01)

(58) Field of Classification Search
CPC .............. B01D 53/1475; B01D 53/326; B01D 2257/504; B01D 2258/06
See application file for complete search history.

(56) References Cited

U.S. PATENT DOCUMENTS

| | | | |
|---|---|---|---|
| 3,661,753 A | 5/1972 | Aylward et al. | |
| 4,082,497 A * | 4/1978 | Crawford | F23D 91/02 431/351 |
| 7,087,331 B2 * | 8/2006 | Keefer | H01M 8/04089 429/495 |
| 2005/0186462 A1 * | 8/2005 | Belanger | H01M 8/0247 429/468 |
| 2010/0178693 A1 * | 7/2010 | Furukawa | B01D 53/62 435/292.1 |
| 2020/0016535 A1 * | 1/2020 | Dakhil | B01D 53/8671 |

(Continued)

FOREIGN PATENT DOCUMENTS

| | | |
|---|---|---|
| WO | 2016138469 A1 | 9/2016 |
| WO | 2018156642 A1 | 8/2018 |
| WO | 2021012055 A1 | 1/2021 |

OTHER PUBLICATIONS

International Search Report and Written Opinion dated Aug. 3, 2022, for corresponding PCT Application No. PCT/US2022/026365 filed Apr. 26, 2022.

Primary Examiner — Christopher P Jones
(74) Attorney, Agent, or Firm — Chamberlain, Hrdlicka, White, Williams & Aughtry

(57) ABSTRACT

The present disclosure relates to an apparatus, system and method for selectively capturing a carbon-containing gas from an input gas mixture.

27 Claims, 12 Drawing Sheets

(56) References Cited

U.S. PATENT DOCUMENTS

2020/0289973 A1* 9/2020 Salehpoor ................. E03B 3/28
2020/0378014 A1   12/2020 Licht
2022/0170388 A1*  6/2022 O'Donnell ............. B63H 11/00
2022/0178036 A1*  6/2022 Campbell .............. B01D 69/02

* cited by examiner

FIG. 2A
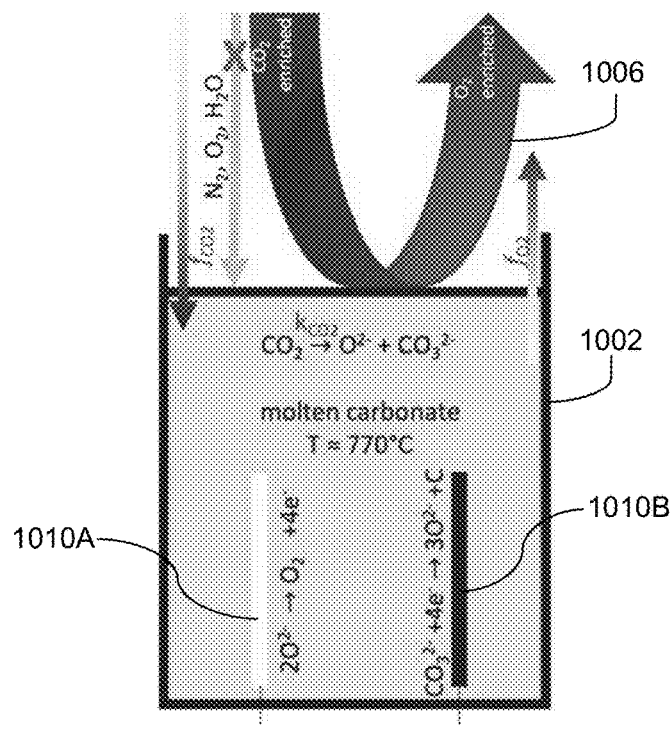
FIG. 2B
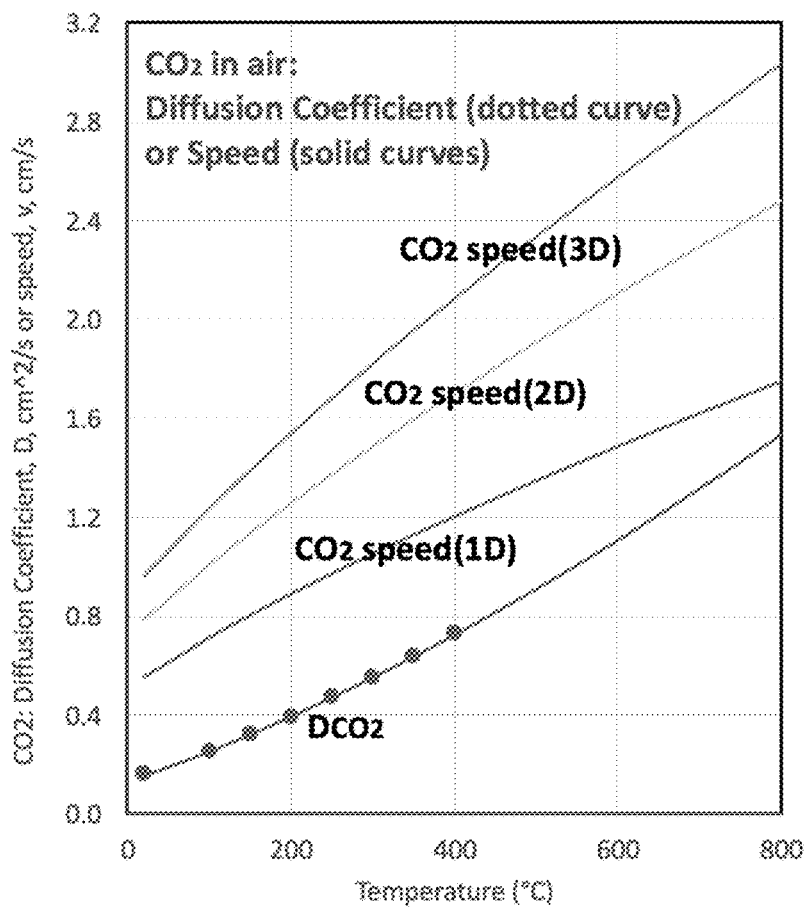
FIG. 2

FIG. 3A
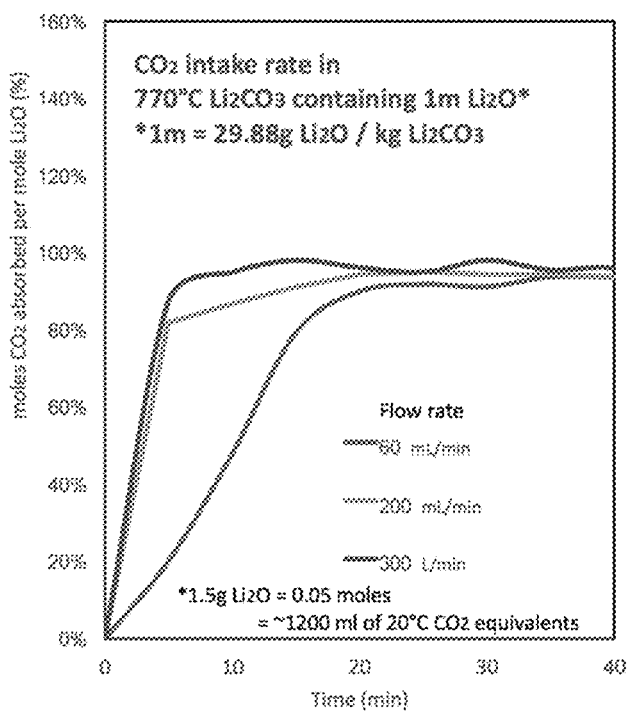
FIG. 3B
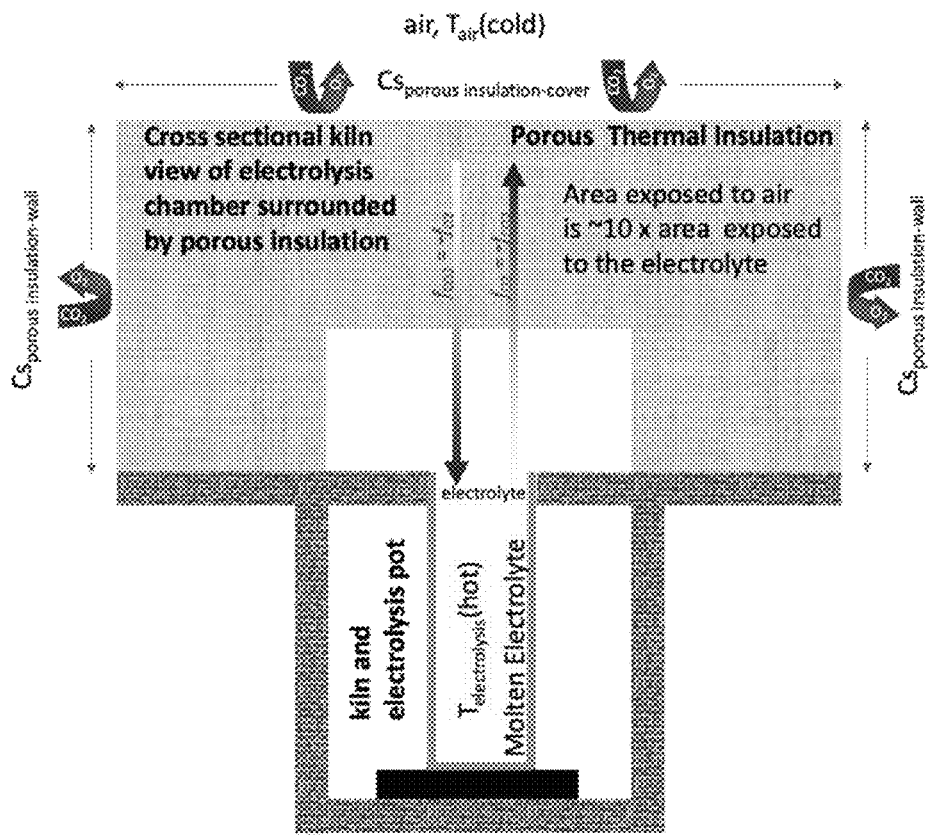
FIG. 3

FIG. 4A
FIG. 4B
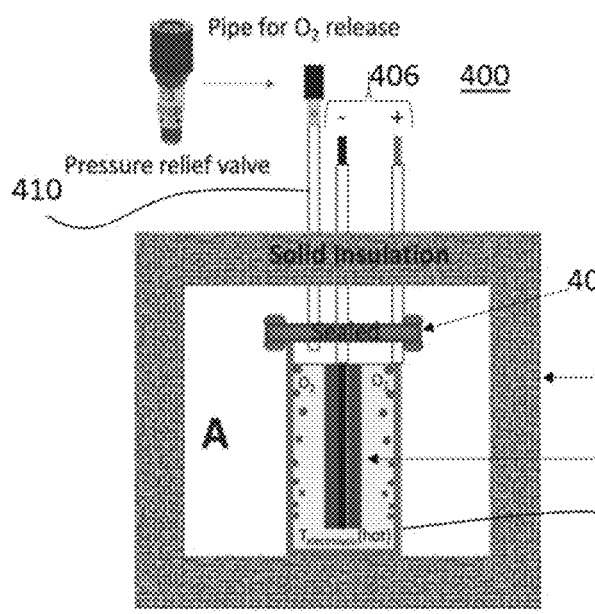
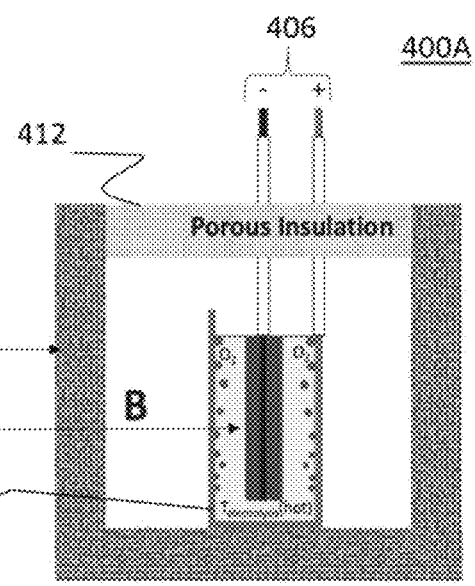
FIG. 4

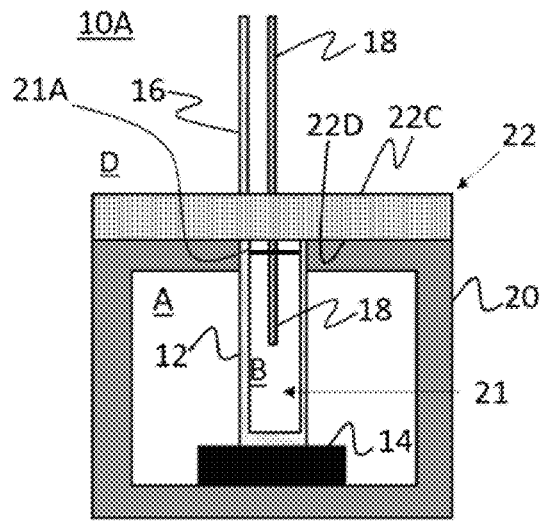
FIG. 5A
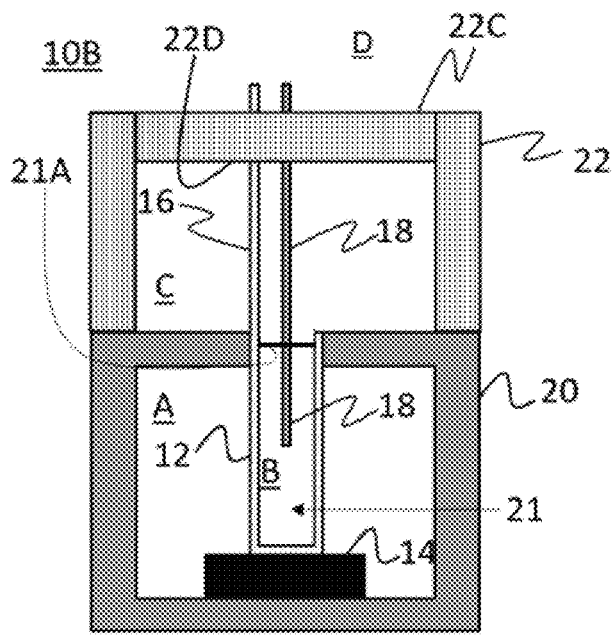
FIG. 5B
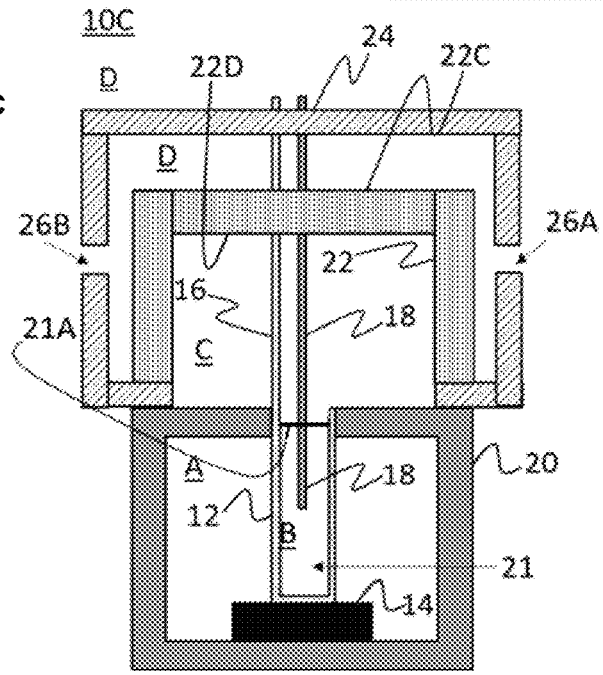
FIG. 5C
FIG. 5

FIG. 6A  200A
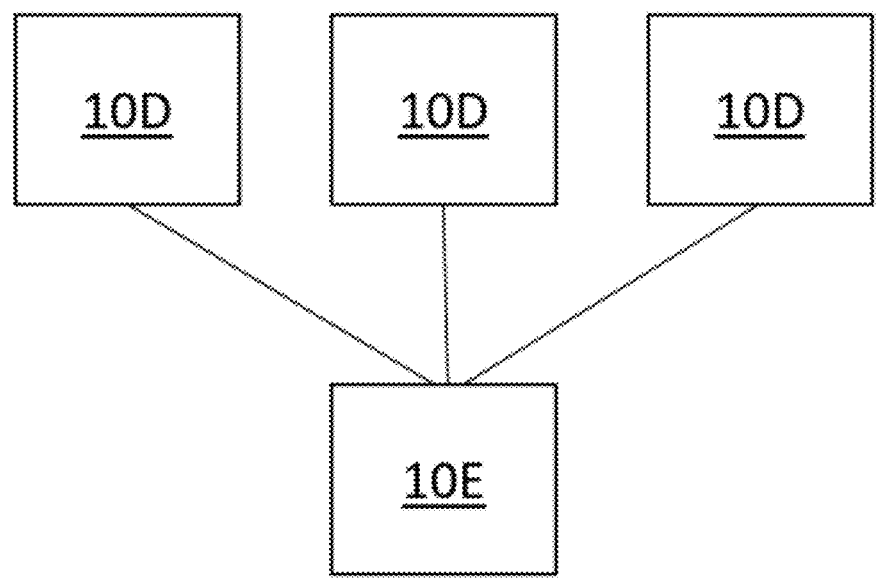
FIG. 6B  200B
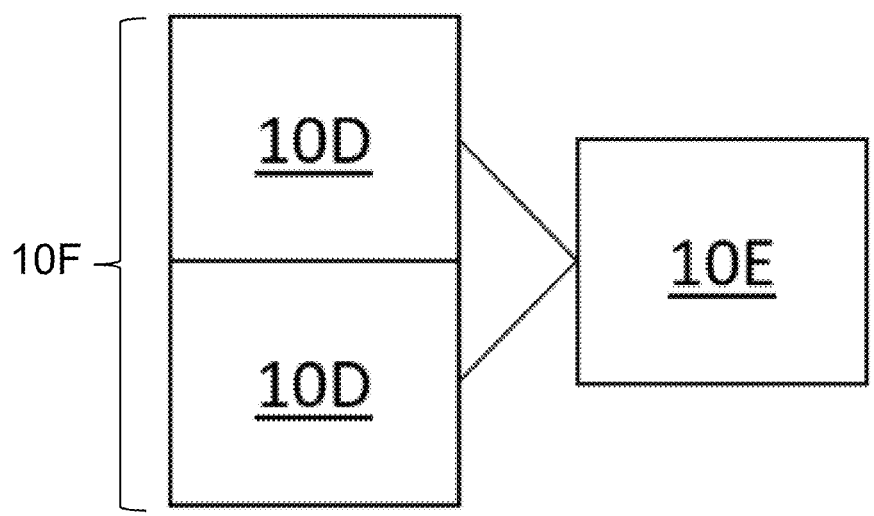
FIG. 6

APPARATUS, SYSTEM AND METHOD FOR DIRECT CAPTURE OF CARBON-CONTAINING GAS

CROSS-REFERENCE TO RELATED APPLICATIONS

This application claims priority to and the benefit of: U.S. Provisional Patent Application Ser. No. 63/179,778 filed on Apr. 26, 2021; U.S. Provisional Patent Application Ser. No. 63/305,544 filed on Feb. 1, 2022; and, U.S. Provisional Patent Application Ser. No. 63/318,944 filed on Mar. 11, 2022, each of which are hereby incorporated by reference in their entirety.

TECHNICAL FIELD

The present disclosure relates to selectively capturing a carbon containing gas from an input gas mixture. In particular, the present disclosure relates to an apparatus, system and method for selectively capturing the carbon containing gas from the input gas mixture by use of a thermal insulator and a media that has an affinity for the carbo-containing gas.

BACKGROUND

Atmospheric carbon dioxide ($CO_2$) concentration cycled at about 235±50 ppm for about 400 millennia until around 1850. Currently atmospheric $CO_2$ concentration is at about 420 ppm and rising at a rapid annual rate. The increased concentration of $CO_2$ in the atmosphere is causing global planetary climate disruptions, habitat loss and various other threats to our planet. $CO_2$ is regarded as a stable molecule such that its transformation into a non-greenhouse gas now poses a significant challenge.

It is known that the increasing atmospheric concentration levels of $CO_2$ can be mitigated by the removal of $CO_2$ from the air and/or by lowering the rate of emission of $CO_2$ into the atmosphere. Known technologies that are intended to remove $CO_2$ from the air that have been explored are costly, water and energy intensive and demonstrate little incentive for long-term storage of removed of $CO_2$. For example, concentrated $CO_2$ produced by air-capture membrane technologies is known to be used to make seltzer water, which re-releases the $CO_2$ when consumed.

As another known example, concentrated $CO_2$ produced by a precipitation/calcination method is currently injected to release fossil fuels, which has a limited capacity for storage, leaches back to the air, and releases $CO_2$ to the air when the fossil fuels are consumed.

A further known example for mitigating the increasing atmospheric concentration levels of $CO_2$ include converting $CO_2$ to carbon and oxidation by molten carbonate electrolysis. A useful product generated by this process includes carbon nanomaterials. Carbon nanomaterials, including graphitic carbon nanomaterials, have great potential as a material resource, with applications ranging from reinforced composites, capacitors, lithium-ion batteries, woven textiles, nano-electronics, and catalysts, to the principal component of lightweight, high strength building materials due to their characteristic superior strength, electrical and thermal conductivity, flexibility and durability. However, technical challenges remain in order to capture sufficient amounts of $CO_2$ so as to substantively decrease the atmospheric concentration levels of $CO_2$ and the associated negative impacts on our planet.

SUMMARY

Some embodiments of the present disclosure relate to a system for selectively transferring a carbon-containing gas from an input gas mixture. The system may include an optional permeable thermal insulator that permits a net selective passage therethrough of the carbon-containing gas from the input gas mixture at a first temperature and a plenum for housing a media at a second temperature that is greater than the first temperature. The media having a first affinity for carbon within the carbon-containing gas received from the optional thermal insulator and the media acts as a carbon sink. When used, the optional thermal insulator may be positioned between a source of the input gas mixture and the plenum.

Some embodiments of the present disclosure relate to a method for reducing a carbon-containing gas content of an input gas mixture. The method comprising the steps of: providing a media in fluid communication with a source of the input gas mixture, the media having an affinity to react with a carbon-containing gas of the input gas mixture; establishing a temperature differential whereby the media has a greater temperature than the input gas mixture; and reacting the media and carbon-containing gas together so that the media acts as a carbon sink for reducing the carbon-containing gas content of the input gas mixture.

Some embodiments of the present disclosure relate to an apparatus for capturing carbon dioxide ($CO_2$) from an input gas mixture. The apparatus comprises an anode and cathode positioned within an electrolytic cell; a molten electrolyte media positioned between the anode and the cathode, wherein the molten electrolyte media defines an upper surface with a first surface area and wherein the upper surface is in fluid communication with a plenum containing the input gas mixture; and a thermal insulator that is positioned between the plenum containing the input gas mixture and the upper surface, wherein the thermal insulator is configured to facilitate the net selective passage of $CO_2$ therethrough to the upper surface. The apparatus is configured to selectively heat and electrolytically split the captured $CO_2$.

In some embodiments of the apparatus, the input gas mixture is air and the source of the input gas mixture is planet earth's atmosphere.

In some embodiments of the apparatus, the input gas mixture is an anthropogenic $CO_2$-containing gas, an industrial waste-gas stream, a gas from a reservoir of sequestered $CO_2$, an emission gas from an industrial plant, an emission gas from a chemical reactor, an emission gas from a power generating plant, an emission gas from a steam generation facility, an emission gas from a pyrolysis reactor, a $CO_2$-containing gas product from combusting a fossil fuel, a $CO_2$-containing gas product from transforming a fossil fuel, a $CO_2$-containing gas product from heating, a $CO_2$-containing gas product from transportation, a $CO_2$-containing gas product from production of a polymer, a $CO_2$-containing gas product from production of a plastic or combinations thereof.

In some embodiments of the apparatus, the thermal insulator has a surface area that is between 2 and 100 times greater than the first surface area of the upper surface of the molten electrolyte media within the electrolytic cell.

In some embodiments of the apparatus, the apparatus further comprises a housing positioned between the plenum containing the input gas mixture and the thermal insulator.

In some embodiments of the apparatus, the thermal insulator and the housing define an inter-insulation plenum with a first end, a second end and the cell is positioned therebetween and wherein the inter-insulation plenum receives the input gas mixture at the first end.

In some embodiments of the apparatus, the electrolytic cell comprises at least one metal wall that acts as the anode.

In some embodiments of the apparatus, the anode and the cathode are configured to select a relative amount of the constituent carbon nanostructures within the CNM product.

In some embodiments of the apparatus, the electrolysis current and voltage are configured to select a relative amount of the constituent carbon nanostructures within the CNM product.

In some embodiments of the apparatus, a metal salt, metal, or other additives are added to the electrolyte to select a relative amount of the constituent carbon nanostructures within the CNM product.

In some embodiments of the apparatus, the electrolyte comprises one or more carbonate salts to select a relative amount of the constituent carbon nanostructures within the CNM product.

In some embodiments of the apparatus, the electrolyte is configured for enhanced thermal properties that enhance selective capture of $CO_2$ from the input gas mixture.

In some embodiments of the apparatus, electrolyte can store excess thermal energy.

In some embodiments of the apparatus, the input gas mixture is redirected through the apparatus using a wind lens or wind focus.

In some embodiments of the apparatus, heat is input to drive a heat engine or drive input gas mixture movement.

Some embodiments of the present disclosure relate to a system for capturing carbon dioxide ($CO_2$) from an input gas mixture. The system comprises at least two apparatus, wherein each apparatus comprises: an anode and cathode positioned within an electrolytic cell; a molten electrolyte media positioned between the anode and the cathode, wherein the molten electrolyte media defines an upper surface with a first surface area and wherein the upper surface is in fluid communication with a plenum containing the input gas mixture; and a porous thermal insulator that is positioned between the plenum containing the input gas mixture and the upper surface, wherein the porous thermal insulator is configured to facilitate the net selective passage of $CO_2$ therethrough to the upper surface. Each apparatus of the system is configured to selectively heat and electrolytically split the captured $CO_2$ by an electrolysis process.

In some embodiments of the system, at least two apparatus are vertically arranged in a stack for lowering a physical footprint area of the system.

In some embodiments of the system, the system further comprises a source of heat and a source of electrical current that are operatively coupled to each apparatus.

In some embodiments of the system, the system further comprises a source of heat and a source of electrical current that are operatively coupled to the at least two apparatus.

Some embodiments of the present disclosure relate to a method for direct capture of carbon dioxide ($CO_2$) from an input gas mixture within a plenum that comprises $CO_2$. The method comprising the steps of: establishing fluid communication between the input gas mixture and an outer surface of a porous, thermal insulator; selectively capturing $CO_2$ from the input gas mixture by passing $CO_2$ through the thermal insulator into a second plenum; establishing fluid communication between an inner surface of the porous, thermal insulator and an electrolyte media within the second plenum, wherein the electrolyte media is configured to accentuate capture of $CO_2$; and, collecting from an electrode within the second plenum a carbon nanomaterial product generated from the captured $CO_2$.

In some embodiments of the apparatus, system and/or method, the input gas mixture comprises at least one carbon-containing gas.

In some embodiments of the apparatus, system and/or method, the input gas mixture is air, an anthropogenic $CO_2$-containing gas, an industrial waste-gas stream, a gas from a reservoir of sequestered $CO_2$, an emission gas from an industrial plant, an emission gas from a chemical reactor, an emission gas from a power generating plant, an emission gas from a steam generation facility, an emission gas from a pyrolysis reactor, a $CO_2$-containing gas product from combusting a fossil fuel, a $CO_2$-containing gas product from transforming a fossil fuel, a $CO_2$-containing gas product from heating, a $CO_2$-containing gas product from transportation, a $CO_2$-containing gas product from production of a polymer, a $CO_2$-containing gas product from production of a plastic or combinations thereof.

In some embodiments of the apparatus, system and/or method, an input rate of the input gas mixture, or an exit rate of the input gas mixture is accelerated by altering a pressure between a first and a second side of the porous thermal insulator by use of a diaphragm pump.

In some embodiments of the apparatus, system and/or method, an input rate of the input gas mixture, or an exit rate of the input gas mixture is accelerated by altering a pressure between a first and second side of the porous thermal insulator by use of a blower or a fan.

In some embodiments of the apparatus, system and/or method, further comprises a compressor mechanism for compressing the input gas mixture to a pressure greater than ambient pressure.

In some embodiments of the apparatus, system and/or method, the input gas mixture is pressurized.

In some embodiments of the apparatus, system and/or method, an off-gas generated in the second plenum is hotter than the input gas mixture.

In some embodiments of the apparatus, system and/or method, an off-gas generated in the second plenum is oxygen ($O_2$).

In some embodiments of the apparatus, system and/or method, the off-gas product compensates or enhances an input rate of the input gas mixture and/or the $CO_2$ capture in the internal second media.

In some embodiments of the method, the method further comprises a step of transferring thermal energy from the off-gas product to the input gas mixture.

In some embodiments of the apparatus, system and/or method, the porous thermal insulator is substantially completely porous and open to the input gas mixture.

In some embodiments of the apparatus, system and/or method, the porous thermal insulator is an open channel, thermal insulator that inhibits heat transfer between the second plenum and the input gas mixture.

In some embodiments of the apparatus, system and/or method, the porous thermal insulator is adjustable to adjust gas flow and heat transfer therethrough.

In some embodiments of the apparatus, system and/or method, the porous thermal insulator has a surface area that is between 1 and 100 times greater than a surface area of the internal second media. In some embodiments of the apparatus, system and/or method, the porous thermal insulator has a surface area that is between 2 and 20 times greater than a surface area of the internal second media.

In some embodiments of the apparatus, system and/or method, a ratio of the surface area of porous thermal insulator relative to a surface area of an electrolyte surface of the electrolyte media is adjustable.

In some embodiments of the apparatus, system and/or method, the inner surface of the porous thermal insulator directly contacts the electrolyte media.

In some embodiments of the apparatus, system and/or method, the inner surface of the porous thermal insulator is proximal to the electrolyte media with a gas space positioned therebetween.

In some embodiments of the method, the method further comprising a third step of positioning a non-porous housing for about the porous thermal insulator for defining an inter-insulation plenum, also referred to as a flow channel, with a first end, a second end and wherein the inter-insulation plenum is configured to receive the input gas mixture at the first end.

In some embodiments of the apparatus, system and/or method, the non-porous housing is a thermal insulator.

In some embodiments of the apparatus, system and/or method, excess heat generated by the method is used to heat or power external devices.

In some embodiments of the apparatus, system and/or method, a heat pump or a heat engine is used to heat the input gas mixture, the internal second media or a combination thereof.

In some embodiments of the apparatus, system and/or method, joule heat, industrial waste heat, solar heat, geothermal heat, exhaust heat or a combination thereof, is used to heat the input gas mixture, the internal second media or a combination thereof.

In some embodiments of the apparatus, system and/or method, further comprise a vortex tube, a heat pump, a heat engine and combinations thereof for increasing a concentration of the carbon-containing gases within the input gas mixture; increasing a flow rate of the input gas mixture; or combinations thereof.

In some embodiments of the apparatus, system and/or method, the thermal insulator is configured to enhance an exhaust flow of an off-gas product from the molten electrolyte media, to increase a rate at which the carbon-containing gas passes through the thermal insulator or combinations thereof.

In some embodiments of the apparatus, system and/or method, the thermal insulator is configured to selectively pass a greater amount of the carbon-containing gas therethrough as compared to other non-carbon-containing gases that are constituents of the input gas mixture.

In some embodiments of the apparatus, system and/or method, system further comprises one or more shiftable members that shift to shift their position to direct a flow of gas in a first direction or a second direction within the flow channel, wherein a first direction is towards an input aperture and the second direction is opposite and towards the output aperture.

Some embodiments of the apparatus, system and/or method further comprise situating a cover that is configured to regulate access to the captured $CO_2$.

In some embodiments of the apparatus, system and/or method, one or more components of the selectively captured $CO_2$ are mixed in the electrolyte media via mechanical mixing, agitation, stirring, convection, bubbling or a combination thereof.

In some embodiments of the apparatus, system and/or method, the input gas mixture comprises carbon-containing gases other than $CO_2$, which the electrolyte media also has an affinity for.

In some embodiments of the method, the electrolyte media is a molten electrolyte media.

In some embodiments of the method, the method further comprises the additional steps of: heating an electrolyte to obtain the molten electrolyte media; disposing the molten electrolyte media between an anode and a cathode in an electrolytic cell; selectively heating the $CO_2$ within the input gas mixture with at least the molten electrolyte media; applying an electrical current to the cathode and the anode in the cell for electrolytically splitting (splitting by an electrolysis process) the selectively heated $CO_2$; and collecting a carbon nanomaterial product from the cathode of the cell.

In some embodiments of the method, the method further comprises a step of generating an oxygen ($O_2$) product within the molten electrolyte media.

In some embodiments of the apparatus, system and/or method, the $O_2$ product enhances a convective current within the molten electrolyte media for mixing the molten electrolyte media.

In some embodiments of the apparatus, system and/or method, the carbon nanomaterial product comprises one or more morphologies of graphitic nanocarbon such as, but not limited to: carbon nanotubes, carbon nano-onions, platelets, nano-scaffolds, nanohelices, nanoflowers, nanotrees, nanobelts, graphene, doped carbon nanomaterials, magnetic carbon nanomaterials, amorphous carbon or a combination thereof.

In some embodiments of the apparatus, system and/or method, a morphology of the carbon nanomaterial product may be adjusted by changing the electrolyte media temperature, $CO_2$ rate, current, voltage, cathode composition, anode composition or electrolyte media composition.

In some embodiments of the apparatus, system and/or method, the molten electrolyte media comprises carbonates.

In some embodiments of the apparatus, system and/or method, the electrical current is supplied by a non-fossil energy source, including, but not limited to solar, wind, hydroelectric, geothermal, tidal, wave, nuclear power or combinations thereof.

In some embodiments of the method, the method further comprises a step of activating the electrolyte media.

In some embodiments of the apparatus, system and/or method, the electrolyte media comprises an added oxide.

In some embodiments of the apparatus, system and/or method, the electrolyte media is molten and reused to enhance the degree of $CO_2$ conversion into a different chemical substance.

In some embodiments of the apparatus, system and/or method, the electrolyte media is molten and time equilibrated to enhance the degree of $CO_2$ conversion.

In some embodiments of the apparatus, system and/or method, the upper surface of the electrolyte media is located close to the lower surface of the internal second media to enhance the degree of $CO_2$ conversion.

In some embodiments of the apparatus, system and/or method, the electrical current is low to enhance the degree of $CO_2$ conversion.

In some embodiments of the apparatus, system and/or method, the electrolytic cell is metal to enhance the degree of $CO_2$ conversion.

In some embodiments of the apparatus, system and/or method, multiples of the $CO_2$ capture apparatus are vertically stacked to reduce the horizontal footprint area of the method per unit of input gas mixture processed.

In some embodiments of the method, the method further comprises repeating steps a, b, c and d continuously.

In some embodiments of the method, the method further comprises repeating steps a, b, c and d and a step of replacing the internal media.

In some embodiments of the apparatus, system and/or method, the input gas mixture is accelerated using wind. In some embodiments of the apparatus, system and/or method, the input gas mixture is redirected using a wind lens or a wind focus.

In some embodiments of the apparatus, system and/or method further comprises a second layer of thermal insulation positioned between the source of the input gas mixture and a first side of the thermal insulator wherein the second layer of thermal insulation is substantially pore free and/or impermeable to the input gas mixture.

In some embodiments of the apparatus, system and/or method the electrolytic cell comprises at least one metal wall that acts as the anode.

In some embodiments of the apparatus, system and/or method the electrolytic cell the anode and the cathode are each adjusted to form a different carbon nanomaterial or to increase the amount of a desired carbon nanomaterial morphology within the carbon nanomaterial product.

In some embodiments of the apparatus, system and/or method the electrolytic cell the anode and the cathode are each adjusted to form a different carbon nanomaterial or to increase the amount of a desired carbon nanomaterial morphology within the carbon nanomaterial product.

In some embodiments of the apparatus, system and/or method a metal salt, metal, or other additives added to the electrolyte to form different carbon nanomaterial or to increase the amount of a desired carbon nanomaterial morphology within the carbon nanomaterial product.

In some embodiments of the apparatus, system and/or method the electrolyte media comprises one or more carbonate salts to form different carbon nanomaterial or to increase the amount of a desired carbon nanomaterial morphology within the carbon nanomaterial product.

In some embodiments of the apparatus, system and/or method the electrolyte is adjusted for enhanced thermal properties In some embodiments of the apparatus, system and/or method the electrolyte is adjusted for to change the absorptivity of various gases from the input gas mixture.

In some embodiments of the apparatus, system and/or method the electrolyte can be used to store excess thermal energy.

Without being bound by any particular theory, the embodiments of the present disclosure provide an economical, scaleable and robust approach for selectively capturing carbon-containing gases from an input gas mixture by creating a temperature differential between the input gas mixture and a media with an affinity for reacting with the carbon-containing gas. In some embodiments, a source of the input gas mixture can be one or more anthropogenic sources of carbon-containing gas, such as $CO_2$.

BRIEF DESCRIPTION OF THE DRAWINGS

FIG. 1 shows three schematics of systems according to embodiments of the present disclosure, wherein FIG. 1A shows a first system; FIG. 1B shows a second system; FIG. 1C shows a third system; and, FIG. 1D shows a third system.

FIG. 2 a schematic and experimental data, wherein FIG. 2A shows a schematic of electrolytic splitting of $CO_2$ during an electrolysis process; and, FIG. 2B shows line graphs of data that represent a diffusion coefficient of carbon dioxide ($D_{CO2}$) and speed ($V_{CO2}$) in air, as function of temperature.

FIG. 3 shows data and a schematic, wherein FIG. 3A shows line graphs of data that represent experimental rates of $CO_2$ absorption during an electrolysis reaction at 770° C. in 1 m $Li_2O$ (mol/kg) in $Li_2CO_3$ with three different flow rates; and, FIG. 3B is a schematic of a configuration according to embodiments of the present disclosure.

FIG. 4 shows two configurations according to the embodiments of the present disclosure, wherein FIG. 4A shows a sealed configuration; and FIG. 4B shows an unsealed configuration.

FIG. 5 shows three schematics of apparatus according to the embodiments of the present disclosure, wherein FIG. 5A shows a first apparatus; FIG. 5B shows a second apparatus; and, FIG. 5C shows a third apparatus.

FIG. 6 shows two schematics of systems according to the embodiments of the present disclosure, wherein FIG. 6A shows a top-plan view of a first system; and, FIG. 6B shows a side-elevation view of a second system.

FIG. 7 shows two schematic that each represent a method according to the embodiments of the present disclosure, wherein

FIG. 10 shows schematics of apparatus configurations, according to embodiments of the present disclosure and experimental data obtained therefrom, wherein FIG. 10A shows two apparatus configurations; FIG. 10B has an upper panel and a lower panel, each of which shows an apparatus configuration and a line graph that depicts the change in percent $CO_2$ ($CO_2$ %) over time; FIG. 10C has an upper, middle and lower panel, each of which shows an apparatus configuration and the change in $CO_2$ content ($CO_2$ parts per million (ppm)) over time.

FIG. 12 shows schematics of apparatus configurations, according to embodiments of the present disclosure that increase the interaction path length of the input gas with the thermal insulator, wherein: FIG. 12A shows a flow channel with an extended length that can be further extended by one or more ridges and/or valleys defined by the thermal insulator and/or the housing; and, FIG. 12B shows a conduit for collecting and separating the flow of a hot off-gas product.

DETAILED DESCRIPTION

Embodiments of the present disclosure relate to one or more apparatus, one or more systems and one or more methods that are useful for selectively capturing carbon dioxide ($CO_2$) from an input gas. The input gas may be a substantially pure gas, a pure gas or a combination of different gases and, therefore, the term "input gas" and "input gas mixture" can be used interchangeably herein. According to the embodiments of the present disclosure, the captured $CO_2$ can be subjected to an electrolysis process, also referred to herein as the electrosynthesis process, for generating a carbon nanomaterial (CNM) product from the carbon within the $CO_2$. The terms "carbon nanomaterial product" and "CNM product" are used herein to refer to a collection of nanocarbon, which may also be referred to as nano-scaled carbon, of one or more morphologies. The term "nanocarbon" is used herein to refer to carbon that is arranged into specific structures, such as graphitic nanocarbon structures, within the nanoscale. In particular, the $CO_2$ that is selectively captured from the input gas mixture can be split into carbon and oxygen using the molten electrolyte media and a variety of electrolysis process configurations. The electrolysis process can cause a mass transfer of carbon from a gas phase into the molten electrolyte media, the solid CNM product or both. The CNM product can be a substantially pure, or pure, carbon nanomaterials (CNMs) including carbon nanotubes (CNTs). The CNM product may comprise one or more morphologies of CNM structures, such as carbon nanotubes, carbon nano-onions, nanoflowers, nano-trees, nanobelt, platelets, nano-scaffolds, helical carbon nanomaterials, graphene, doped carbon nanomaterials, amorphous carbon or a combination thereof. Optionally, one or more parameters of the electrolysis process may be adjusted in order to change the relative amount of a given morphology within the CNM product.

Figure 1:
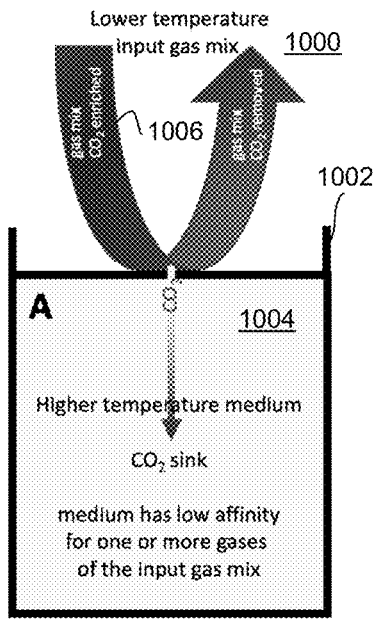
Figure 1:
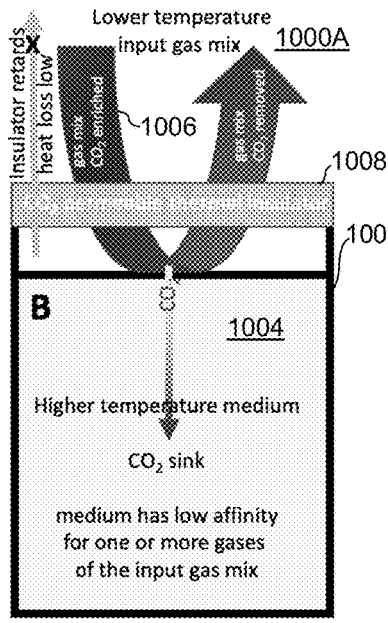
Figure 1:
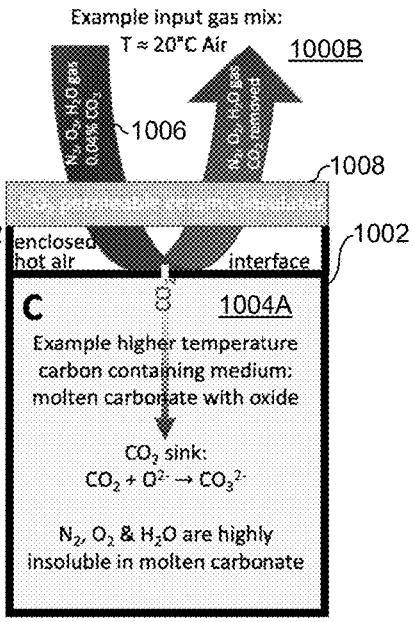
Figure 1:
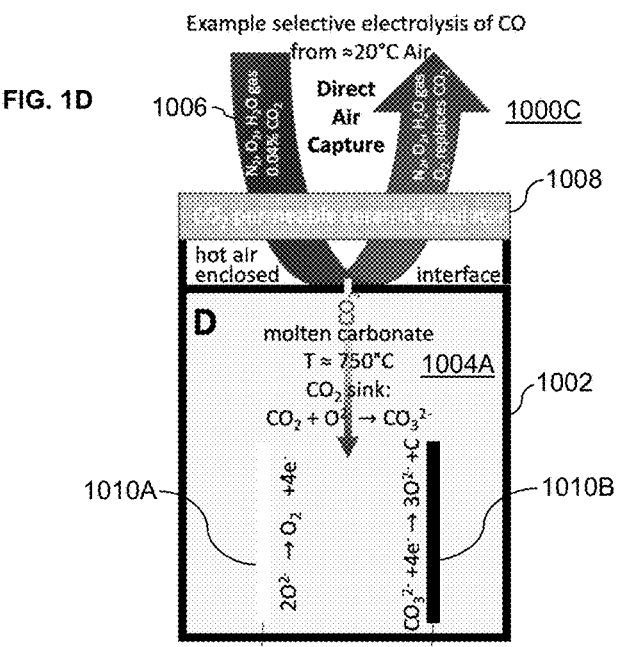

FIG. 1 shows implementations of systems according to embodiments of the present disclosure. FIG. 1A shows a system 1000 that comprises a vessel 1002 that contains a media 1004 with an affinity for a carbon-containing gas within an input gas 1006. The vessel 1002 may also be more generally referred to as a "plenum" and this term is used herein to refer to any space that can be filled with matter, whether liquid, gas, solid or combinations thereof. A plenum may be open, closed, substantially sealed to restrict fluid ingress or egress or fluid-tight sealed so as to prevent fluid ingress or egress. The term "affinity" is used herein to refer to a propensity for the media to absorb, react with, chemically bond with or bind with the carbon-containing gas within the input gas 1006. So that, more often than not, the media 1004 will absorb, react with, chemically bond with or bind with the carbon-containing gas, for example without being bound by any limitations or theories, by participating in one or more chemical reactions with the carbon-containing gas, one or more electrochemical reactions with the carbon-containing gas, preferentially absorb the carbon-containing gas, bind with the carbon-containing gas or combinations thereof. In some embodiments of the present disclosure, the affinity of the media 1004 to react with the carbon-containing gas will result in a different chemical substance being generated. The term "different chemical substance" is used herein to refer to a chemical substance that would not otherwise be generated without the media having an affinity to react with the carbon-containing compound.

The vessel 1002 shown in FIG. 1A is open to fluidly communicate with a source of the input gas 1006. The media 1004 has a higher temperature than the input gas 1006. The media also has an affinity to react with carbon-containing gases within the input gas. In FIG. 1A the input gas is enriched with a carbon-containing gas, which in this scenario is $CO_2$. The affinity of the hotter media 1004 for the carbon-containing gas causes at least part, substantially all or all of the carbon-containing to leave the input gas 1006 and enter into the media 1004 within the vessel 1002. The media 1004 may also have an affinity to react with other gases within the input gas 1006, but the affinity to react with carbon-containing gases is higher than the affinity to react with gases that do not contain carbon. In this fashion, the media 1004 can act as a carbon sink whereby the amount of carbon in the input gas 1006 decreases, is substantially depleted or is completely depleted as the carbon-containing gas enters and reacts with the media 1004 whereas the amount of non-carbon containing gases in the input gas 1006 is minimally changed, or not changed at all.

FIG. 1B shows a system 1000A that includes the vessel 1002, the media 1004 and a thermal insulator 1008 that is positioned between an upper surface of the media 1004 and the source of input gas 1006. The media 1004 is hotter than the input gas 1006. The thermal insulator 1008 may be porous and permit the passage therethrough of carbon-containing gases. In some embodiments of the present disclosure, the thermal insulator 1008 may be permeable to carbon-containing gases and to other constituent gases of the input gas 1006 that do not contain carbon. In some embodiments of the present disclosure, the thermal insulator 1008 may have greater permeability to carbon-containing gases, as compared to gases in the input gas 1006 that do not contain carbon, meaning that under the same or substantially similar thermodynamic parameters, a greater net amount of the carbon-containing gas will pass through the thermal insulator than the gas that does not contain carbon. In some embodiments of the present disclosure, the thermal insulator 1008 may impermeable or less permeable to gases in the input gas 1006 that do not contain carbon.

In some embodiments of the present disclosure, the media's affinity to react with the carbon-containing gas and the permeability properties of the thermal insulator 1008 can act in concert to deplete the carbon-containing gas content of the input gas 1006 and increase the carbon content of the media 1004. As in FIG. 1A the media 1004 of FIG. 1B can act as a carbon sink.

FIG. 1C shows a system 1000B that has many of the same features as the system 1000A (shown in FIG. 1B) with the added features that the specific input gas is air, and the space defined between an inner/lower surface of the thermal insulator 1008 and the upper surface of the media 1004A is also hotter than the input gas 1006, and can contain enclose air that is also hotter than the input gas 1006. In the system 1000B, the media 1004A is hotter than the input gas 1006 also. For example, the media 1004A may be a molten carbonate electrolyte, which is optionally supplemented with an oxide, so that the upper surface of the media 1004A forms a gas-liquid interface. In system 1000B, the media 1004A has a high affinity for reacting with carbon-containing gases in the input gas 1006 and a comparatively low affinity for reacting with other constituent gases of the input gas 1006 that don't contain carbon, for example nitrogen, oxygen and water. In some embodiments of the present disclosure, the thermal insulator 1008 and the media 10004A can reduce the carbon content of the input gas 1006 by facilitating reactions between the media 1004A and a carbon-containing gas, such as $CO_2$. In this fashion, the system 1000B acts as a carbon sink by selectively reducing the carbon content of the input gas 1006.

FIG. 1D shows a system 1000C that has many of the same features as system 1000B with system 1000C having the additional features of electrodes 1010A and 10106 submerged within the molten carbonate electrolyte media 1004A (at a temperature of about 750° C.). When an electric current is applied across the electrodes, the carbon-containing gas—in this example $CO_2$ is transformed (or electrolytically split), a new carbon substance is generated and oxygen is produced. The specifics of these electrochemical reactions between the media 1004A and the carbon-containing gas are discussed herein further below.

Figure 7A:
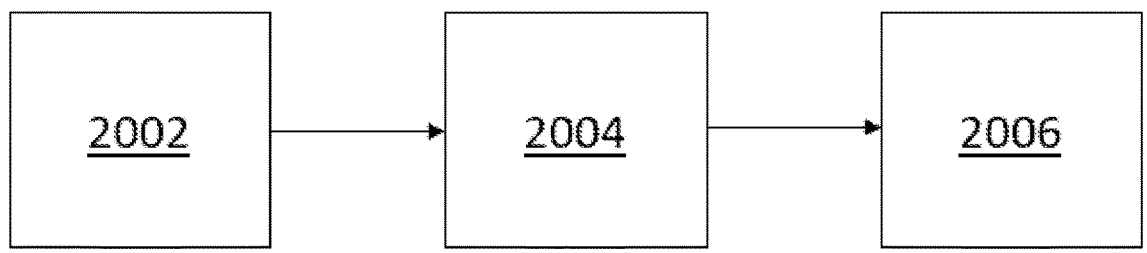
FIG. 7A shows the steps of a first method; and, FIG. 7B shows the steps of a second method.

FIG. 7A shows a schematic of the steps of a method 2000 for reducing a carbon-containing gas content of an input gas mixture. The method 2000 comprises the steps of: providing 2002 a media in fluid communication with a source of the input gas mixture, where the media has an affinity to react with a carbon-containing gas of the input gas mixture; establishing 2004 a temperature differential whereby the media has a greater temperature than the input gas mixture; and reacting 2006 the media and carbon-containing gas together so that the media acts as a carbon sink for reducing the carbon-containing gas content of the input gas mixture.

$CO_2$ is rapidly absorbed and spontaneously concentrated from air by an exothermic reaction with the molten electrolyte media by reacting with oxides in the molten salt. This continuously renews the molten carbonate electrolyte media, without being bound by any particular theory, as described by the following Equations 1, 2 and 3:

$$CO_{2(gas)} + O_2^- \rightarrow CO_3^{2-} \quad \text{(Equation 1)}$$

The electrolysis reaction is in accord with equation (2) below:

$$CO_3^{2-} \rightarrow C + O_2 + O^{2-} \quad \text{(Equation 2)}$$

In this process, $CO_2$ is split by molten electrolysis, to produce the CNM carbon product and hot oxygen, and with the carbon as the CNM product as described by equation (3):

$$CO_2 \rightarrow CNM_{product} + O_2 \quad \text{(Equation 3)}$$

As shown in FIG. 3A, molten $Li_2CO_3$ electrolytes rapidly absorb and react with gaseous $CO_2$ but are highly insoluble to the principle atmospheric gases $N_2$, $O_2$, and $H_2O$. The experimental rate of $CO_2$ absorption at 770° C. in 1 m $Li_2O$ (mol/kg) $Li_2CO_3$ is high and is significantly more rapid than required to sustain the splitting of $CO_2$ by electrolysis.

FIG. 2A shows a schematic of the electrolytic splitting of $CO_2$ in molten carbonate media 1004A. Molten $Li_2CO_3$ electrolyte media 1004A has an affinity for carbon and rapidly absorbs and reacts with the gaseous $CO_2$, but has a lower affinity—at least in part due to being highly insoluble to —$N_2$, $O_2$ and $H_2O$ the primary constituent gases in atmospheric air. The grey arrow that extends into the media to show the net mass transfer of carbon into the media 1004A and the yellow arrow with the red X indicates the lack of mass transfer of the other constituent gases in the carbon enriched atmospheric air that was the input gas mixture of FIG. 2A.

The experimental rapid rate of $CO_2$ absorption in a 770° C. molten lithium carbonate media containing one molal lithium oxide is shown in FIG. 3A. FIG. 2A shows a schematic that represents one physiochemical feature of the electrolysis process that results in $CO_2$ from the input gas mixture reacting with the media 1004A. The $CO_2$ is readily absorbed in the electrolyte media via an exothermic reaction characterized by Equations 4a and 4b, $N_2$, $O_2$ and $H_2O$ from the air are highly insoluble in molten $Li_2CO_3$. Note, that the rapid rates of $CO_2$ reactive absorption are measured subsequent to the chemical mixing of oxide with the $Li_2CO_3$; that is in a chemical, rather than an electrochemical, environment. Instead, during the electrolysis, not only is oxide formed at the cathode, but $O_2$ evolves at the anode (FIG. 2A and Equation 3) and rises to the surface.

$$CO_3^{2-} \rightarrow C_{nanomaterials} + O^{2-} + O_2 \quad \text{(Equation 4a)}$$

$$CO_2 + O^{2-} \rightarrow CO_3^{2-}; \; CO_2 + Li_2O \rightarrow Li_2CO_3 \; \Delta H(770° \text{C.}) = -158{,}000 \text{ J/mol} \quad \text{(Equation 4b)}$$

Regarding Equation 4a, the high rate of $CO_2$ absorption, is due to its exothermic chemical reaction with one of the chemical species in the electrolyte media. Without being bound by any theory, the oxide that drives the fast reaction with $CO_2$ is formed by chemical equilibration and by electrolysis of carbonate in the formation of a CNM product.

Regarding Equation 4b, without being bound by any theory, the oxide exothermically reacts with $CO_2$ to continuously renew the carbonate in the electrolyte media, such as in $Li_2CO_3$, with the enthalpy of reaction calculated from that of the individual reactions species using the thermodynamic data available through the NIST Webbook and NIST-JANAF Thermochemical Tables.

The evolving $O_2$ product rises through the electrolyte and enhances convective currents in the electrolyte media that facilitate mixing of incident $CO_2$ and enhances the reaction rate. While the reaction rate from air $CO_2$ into the electrolyte is very high, it will be lower compared to gases mixtures, such as flue gas, containing higher levels of $CO_2$. Alternatively, with or without electrolysis, the rate of reactive absorption of $CO_2$ in molten carbonate electrolyte media with oxide can further increase with enhanced convection, such as mechanical stirring or flowing of the electrolyte or rotating the electrodes, or agitation, or bubbling of the hot gas into the electrolyte.

FIG. 3A shows that the experimental rate of $CO_2$ absorption at 770° C. in 1 m $Li_2O$ (mol/kg) $Li_2CO_3$ is high and is significantly more rapid than required to sustain the splitting of $CO_2$ by electrolysis. Without being bound by any particular theory, in combination with a selective $CO_2$ sink for the binding, trapping, reaction or consumption of $CO_2$, and the lack of solubility by the main constituent gases in air, the diffusion coefficient of $CO_2$ ($D_{CO2}$) in air $D_{CO2}$ in air, can facilitate separating the $CO_2$ from the other constituents of the input gas mixture and sustain a desired rate of the electrolysis reactions occurring within the molten electrolyte media, such as $Li_2CO_3$ (melting point=723° C.), or other electrolyte media mixes of binary or ternary carbonate.

A further physiochemical feature that allows for the $CO_2$ portion within the input gas mixture to be selectively heated independent of the other components of the ambient air is the high conventional rate of $CO_2$ diffusion in the air compared to the rate at which $CO_2$ is consumed during the electrolysis. FIG. 2B shows as the blue line an extrapolation of the known $CO_2$ diffusion in air beyond the range of 0 to 400° C. to the higher temperature domain relevant to $CO_2$ electrolysis. The extrapolation uses the $T(K)^{3/2}$ diffusion coefficient exponential variation of Fick's Diffusion Laws, with an $R^2$ fit>0.9996 from 20-400° C.

Diffusion is traditionally described by Fick's Laws. Without being bound by an particular theory, a fundamentally equivalent, but simpler starting point is the Einstein-Smoluchowski equation describing the relationship between mean square displacement and diffusion. The Brownian motion mean square displacement of a species, i, by diffusion, $<x^2>$, in time, t, is given in 1, 2 or 3 dimensions by Equation 5:

$$<x^2> = q D_i t \quad \text{(Equation 5)}$$

where q is the dimensionality factor (q=2, 4 or 6 for diffusion in 1, 2 or 3 dimensions); $D_i$ is the diffusion coefficient, and t is the time. Note, that molecular motion at interfaces can differ from this ideal case.

This translational displacement is converted to the average diffusion speed, $<x^2>/t$, of $CO_2$ as a function of temperature, see Equation 6:

$$n_{CO2} = <x^2>^{0.5}/t = (q \times D_{CO2}(T))^{0.5}/t_u \quad \text{(Equation 6)}$$

where T is the temperature, and $t_u$ is unit time consistent with the diffusion coefficient.

FIG. 3A includes the $CO_2$ translational displacement, or speed, in air, as calculated with $D_{CO2}$ and Equation 6 as a function of temperature. The diffusion coefficient of $CO_2$ ($D_{CO2}$) and the translational displacement of speed of $CO_2$ in air (nco2) are temperature dependent. In FIG. 2B, the $D_{CO2}$ values are in the dark blue dotted line), and the 1, 2 or 3 dimensional speed of $CO_2$ are respectively shown as the red, yellow and light blue (topmost) line. As illustrated in FIG. 2A, during electrolysis the total moles of gas which leaves the electrolyte media consists of the $O_2$ product from Equation 1. Similarly, this is the same total moles of gas that enters the electrolyte media as the reactant $CO_2$ in Equation 2. Hence to the extent that the gas volumes are consistent with an ideal molar volume, the volume of $CO_2$ which enters from above the electrolyte media is replaced by the volume of $O_2$ which exits from the electrolyte media, and there is no net change of gas volume above the electrolyte media. Note, that while the volumes displaced are the same, as a lighter molecule, the $O_2$ will travel more rapidly than $CO_2$ in the gas phase.

Without being bound by any particular theory, the hot $O_2$ generated by the electrolysis process, which may also be referred to as an off-gas product, could itself be used to produce oxidizing agents for various applications, including but not limited to: disinfectants, for various industrial and oxy-fuel processes and the like. Additionally, the hot $O_2$ can be used to transfer some of its energy back into $CO_2$ being absorbed or be used to pull in more reactant into the system as in a heat engine process. Some embodiments of the present disclosure relate to isolating the $O_2$ off-gas product from the electrolysis cell, for example by way of a conduit that is in fluid communication with the gas space above the liquid-gas interface of carbonate electrolyte media within the electrolysis cell.

Heat may be preserved within the electrolyte media through the addition of a porous, thermal insulator surrounding the electrolysis cell. Note also that air within the gas space of the electrolysis cell—above the upper surface of the electrolyte media—as well as the air within the porous insulation, will contain a growing concentration of oxygen as the electrolysis process proceeds.

The addition of a porous, thermal insulator cover above the molten carbonate electrolyte media allows a gas phase $CO_2$ to diffuse from the input gas mixture into the molten lithium carbonate electrolyte media, this is a further physiochemical feature by which the $CO_2$ portion of input gas mixture can be selectively heated. Without being bound by any theory, in the absence of convection, the maximum rate of $CO_2$ arriving as the reactant for the electrolysis is limited by the maximum one dimensional speed of $CO_2$ in the direction orthonormal to the insulation surface as the $CO_2$ travels towards the interior of a kiln containing the electrolysis cell. Without being bound by any theory, the one dimensional mean displacement per second, and the speed of $CO_2$ in air trapped in the insulation nearest to the ambient air side at 20° C. is $n_{CO2-\,insulation} = n_{CO2}(20°\,C.) = 0.56$ cm $CO_2$ s$^{-1}$.

When the input gas mixture is air sourced from the atmosphere, $CO_2$ originates from ambient air, arriving as a reactant and passing into the porous thermal insulator for electrolytic splitting. The molar volume concentration of $CO_2$ in ambient air (20*C), $V_M(CO_2$ in air) is determined from its 0.04% molar concentration and the molar volume of a gas; that is $V_M(CO_2$ in air)$=V_M(20°\,C.)/0.04\%\,CO_2=1$ mol $CO_2$ per $6.0\times10^7$ cm$^3$ air. The molar flux of $CO_2$ per cm$^2$ through the external surface area of the porous insulation is given as $f(CO_2)_{insulation}$.

The average global speed of air (wind speed) is $n_{air-average}=330$ cm/s (=11.9 kph=7.4 mph), and has been rising at 0.8% per year since 2010. In the Examples, 0.33%, 10% or 100% of this wind speed domain (1, 33 or 330 cm/s) were examined to demonstrate that natural wind, rather than an artificial blower, suffices to maintain $CO_2$ for the embodiments of the present disclosure. Without being bound to any theory, to a first degree of approximation wind at an air speed of air orthogonally striking a one cm$^2$ square area of insulation will be replenish the $CO_2$ depleted by the diffusional mean square displacement at a proportional rate of $Z=n_{air}(cm/s)/nCO_2$. In principle, the air speed can be enhanced by a diaphragm that forces more air through a smaller area or that pressurizes the air. A wind speed increase in turn increases the mole concentration of $CO_2$ striking the area to $Z\times V_M(CO_2$ in air). The $CO_2$ flux is driven by the concentration gradient between that at the exterior surface of the insulation and the concentration at the surface of the electrolyte media. $CO_2$ uptake by the electrolyte media during the electrolysis is rapid; the rate of reaction is fast, expediting mass transfer of carbon into the electrolyte media.

Heat, ($-Q_{in}$), is generated during the electrolysis and without being bound by any theory by (i) the heat of the reaction of $CO_2$ with the $Li_2O$ as it reforms electrolyte media at $\Delta H=-158,000$ J/mol (Equation 4), and (ii) the resistive heating from the electrolysis over-potential. Reactive heat released is the exothermic reaction of $CO_2$ with the electrolytic $Li_2O$, $-\Delta H$ (Equation 4) in accord with the moles of $CO_2$ consumed. The resistive heating from the product of the electrolysis over-potential, h, and the electrolysis current. The rest potential for the electrolytic splitting of $CO_2$ in molten carbonate electrolytes is ~0.8V and varies with the electrolyte media composition and electrolysis electrodes. The additional over-potential to drive a constant current density, I, will vary with electrolyte media composition and electrode composition and texturing, and has been measured for planar electrodes. Heat loss from a system, $P_{out}$, is given by the thermal conductivity, the surface area of thermal contact, A, the difference of temperature across the insulator, $\Delta T$, and the thickness of the insulation, □. Thermal conductivity, k, is often expressed in metric units (W/(mK)), while thermal resistance, R, is often expressed in British units (ft2 hr ° F./Btu) and includes the thickness of the insulator in inches.

$$Pout = kA\Delta T/\square = A\Delta T/R \qquad \text{(Equation 7)}$$

The dual characteristics of a material which allows $CO_2$ to enter the kiln and retain heat within the electrolysis chamber is achievable with porous thermal insulation. Such material has (i) an open porosity (as opposed to close pores or grains) materials, (ii) a high insulation factor, and (iii) can withstand the temperature of the electrolysis conditions in the appropriate temperature domain. The porosity dependence of thermal conductivity for high temperature refractory materials has been studied. Porous thermal insulators capable of withstanding the high temperature (>1150° C.) are alumina silicate and alumina calcium silicate blankets. Examples are various products including "ceramic fiber insulation for furnaces," "alumina silica ceramic fiber," "Durablanket®", or "Cerablanket®". The relevant thermal commercial products often regress to British rather than metric units, have similar available compositions (for example 46% $Al_2O_3$ and 54% $Si_2O$), thicknesses (0.5, 1 or 2" thick), and range of densities (4, 6 or 8 lbs/ft$^3$=pcf).

Even the densest of these alumina silica fiber blankets is lightweight with a high porosity. As an example, the porosity of the 8 pcf density (=0.128 g/cm3) Cerablanket® may be estimated using the solid (pore free) average $d_{solid}$=3.2 g/cm3 density from 46% of the 4.0 g/cm3 density alumina and 54% of the 2.6 g/cm3 density Si2O. The porosity is estimated from the open space as (with $d_{air}$=0.001225 g/cm3)):

$$p=100\% \times (d\text{solid}-d\text{cerablanket})/(d\text{solid}-d\text{air}) \text{ with } d\text{air}=0.001225 \text{ g/cm}^3 \ p(\text{alumina silicate 8 pcf, example})=96\%$$ (Equation 8)

A readily available alumina silica fiber that is 2" thick, 8 pcf, thermal fiber blanket that has rated insulation values respectively at 0° C. (extrapolated), 200° C., 400° C., 600° C. and 800° C. of k and (R) of 0.028 (10), 0.05 (5.7), 0.08 (3.6), 0.19 (2.2) NS 0.20 (1.4), for average thermal coefficients over the temperature range from $T_{electrolysis}$ to $T_{air}$ of k=0.52 W/(mK) (and R=3.8 ft2 hr F.° Btu–1). A mathematical convenience of the "R" expression of thermal resistance is approximate additivity with insulation layers. Hence, an 8", rather than 2", thickness of this insulator will have an R value of approximately 15.2 ft$^2$ hr F.° Btu$^{-1}$.

In an outer layer of insulation lower temperature compatible (less expensive and with higher R values) porous insulation, for example open faced fiberglass insulation, can be utilized. Such insulation is available from a variety of commercial manufactures. An example used here is 4" thick unfaced Corning 710 fiber insulation with R=16.7 and a density of 1.5 pcf 0.024 g/cm$^3$ composed of interwoven glass fibers. From the solid fiber glass density of 2.5 g cm$^{-3}$, the porosity of this insulator is p(4" C701)=99%. Combined, the insulating capability of 8" of alumina silicate 8 pcf facing outward from the interior of the kiln and 4" of C701 unfaced fiberglass insulation extending to the ambient air will be approximately additive, that is they will have an approximated combined R=(15.2+16.7)=31.9 ft$^2$ hr F.° Btu$^{-1}$.

Some embodiments of the present disclosure relate to an apparatus for selectively capturing $CO_2$ from a carbon-containing input gas mixture and generating a CNM product from the captured $CO_2$. The apparatus comprises a pair of electrodes, a cathode and an anode that define an inter-electrode space, which may also be referred to as an electrolysis space, which can receive and contain an electrolyte media. The apparatus also includes a thermal insulator positioned between the source of input gas mixture and the electrolyte media. The thermal insulator is porous and configured to facilitate selective capture of $CO_2$ from the input gas mixture. The apparatus may further comprise a source of electric current, a source of heat a case to contain the electrodes and the electrolyte media and fluid communication with a source of a carbon-containing input gas mixture.

FIG. 5A shows one example of an apparatus 10A, according to embodiments of the present disclosure. The apparatus 10A comprises a case 12, which may also be referred to as an electrolysis chamber or electrolysis cell, for housing a cathode 18, where an anode 16 may form at least a portion of an inner surface of a wall of the case 12. Together the two electrodes define an electrolysis space B therebetween. As will be appreciated by those skilled in the art, optionally the anode 16 may be separate from the wall of the case 12. The case 12 is configured to house an electrolyte media 21 (shown in FIG. 5A in a molten state, with an upper surface indicated as 21A). The electrolysis space B, including the upper surface 21A, may be in fluid communication with a plenum D that contains the input gas mixture, which contains $CO_2$. The case 12 may be supported upon a base 14 within an insulated housing 20, such as a kiln, which defines an insulated plenum A. The apparatus 10 further comprises a thermal insulator 22 that is positioned between the electrolysis space B and the plenum D that contains the input gas mixture. In some embodiments of the present disclosure, the insulated plenum A may also be in fluid communication with the plenum D that contains the input gas mixture.

The plenum D that contains the input gas mixture can be Earth's atmosphere (with a $CO_2$ content of about 420 ppm $CO_2$) or it can be a plenum that houses concentrated anthropogenic $CO_2$-containing gases such as industrial waste-gas streams or reservoirs of sequestered $CO_2$. For example, the plenum D contains—or is the source of—the input gas mixture, which may be any gas that includes $CO_2$ and, optionally, other carbon-containing gases. For example, the source of the input gas mixture may be various industrial plants including but not limited to: cement manufacturing plants; iron refining plants; steel manufacturing plants; plants that make or use one or more of ammonia, ethanol, magnesium, hydrogen, polymers, plastics, glass; waste water treatment plants, food processing plants. The source of the input gas mixture may also be chemical reactors including internal combustion engines and combustion of carbonaceous materials for heating or cooking. Emission gases from a power generating plant, steam generation facility, or pyrolysis reactors may also be a source of the input gas mixture. A $CO_2$-containing gas emitted from these sources or in the production of any high carbon-footprint substance may also contribute to or constitute the input gas mixture. In addition, a $CO_2$-containing gas product of the combustion or transformation of fossil fuels for heating, transportation, and carbon products such as polymers and plastics can also contribute to or constitute the input gas mixture. The temperature of the input gas mixture can range between about –90° C. and about 400° C. For example, if the source of the input gas mixture is the atmosphere, then the range of temperatures may range between about –90° C. and about 75° C. If the source of the input gas is anthropogenic, then the range of temperatures may range between about 50° C. and about 400° C. The case 12 is configured to be in fluid communication with the plenum D in order to receive the input gas mixture within the inter-electrode space B.

In some embodiments of the present disclosure, the anode 16 is formed as a planar structure, a wire structure, a screen, a porous structure, a conductive plate, a flat or folded shim, a coiled structure or the anode can form at least part of an inner side wall of the case 12. The anode 16 can be formed of various conductive materials so that the anode 16 may be oxygen generating or not. Such anode-forming materials include, but are not limited to: any conductive material that has a stable layer, or establishes, a highly stable oxide outer layer that is conducive to oxygen production during the electrolysis reactions performed according to the embodiments of the present disclosure, Ni, Ni alloys, galvanized (zinc coated) steel, titanium, graphite, iron, and a wide variety of metal which establish a highly stable oxide outer layer that is conducive to oxygen production. Further examples of suitable materials for forming the anode 16 include Nickel Alloy 36 (nickel without chromium, but with iron), Nichrome (nickel chromium based alloys) including stainless steels such as SS 304 or SS 316, and inconel alloys, such as Inconel 600, 625, and 718, alloy C-264, or Nichromes such as Chromel A, B or, as the co-nucleation of the alloy components are known to produce high quality CNTs. Binary and ternary transition metal nucleation agents may also be useful that include, but are not limited to: Ni, Cr, Sn, In, Fe, and Mo can also affect CNM product growth.

In some embodiments of the present disclosure, a transition metal may be added on the anode 16, which can be dissolved from the anode 16 to migrate through the electrolyte media 21 onto the cathode 18. The added transition metal can function as a nucleating agent, which may be selected from nickel, iron, cobalt, copper, titanium, chromium, manganese, zirconium, molybdenum, silver, cadmium, tin, ruthenium, zinc, antimony, vanadium tungsten, indium, gallium, or non-transition metals such as germanium or silicon, or a mixture thereof. The transition metal may also be introduced as a dissolved transition metal salt within the electrolyte media 21 directly to migrate onto the cathode 18. It is also possible to add the transition metal nucleating agent directly onto the cathode 18.

In some embodiments of the present disclosure, the cathode 18 is formed as a planar structure, a wire structure a screen, a porous structure, a conductive plate, a flat or folded shim, a sheet, a coiled structure or the cathode can form at least part of an inner side wall of the case 12. The cathode 18 can be formed of various conductive materials that reflect the need for variation of the nucleation point and the CNM product that forms on the cathode 18. Such cathode-forming materials include, but are not limited to: any conductive material, galvanized (zinc coated) steel, titanium, graphite, iron, an alloy that comprises copper and zinc, Monel (Ni 400, a Ni/Cu alloy), Inconel, stainless steel, iron, Nichrome, pure Cu, and brass alloys may also be suitable as materials for making the cathode 18.

The anode 16 and the cathode 18 may be aligned substantially parallel to each other within the case 12, such as a stainless steel case or a case made of substantially pure or pure alumina. The case 12 may be made of any material that is suitable to contain the molten electrolyte media 21 and to sustain the temperatures achieved by the apparatus 10A. The electrodes may be oriented in any orientation, including but not limited to substantially horizontally or substantially vertically, but spaced apart from each other so as to define the electrolysis space B therebetween. In some embodiments of the present disclosure, the electrolysis space B is between about 0.1 cm and about 10 cm. In some embodiments of the present disclosure, the electrolysis space B is about 1 cm. As will be appreciated by those skilled in the art, the dimensions of the electrolysis space B will be dictated by the scale of the apparatus 10A, such as the size of each electrode, the plenum defined within the case, the amount of electric current applied and combinations thereof.

The anode 16 and the cathode 18 are operatively connected to a source of electric current (not shown), which can be any source of an alternating current or a direct current, either constant or not, that provides a current density of between about 0.001 A/cm$^2$ and 10 A/cm$^2$. In some embodiments of the present disclosure, the current density provided between the electrodes is at least 0.02 A/cm$^2$, 0.05 A/cm$^2$, 0.1 A/cm$^2$, 0.2 A/cm$^2$, 0.3 A/cm$^2$, 0.4 A/cm$^2$, 0.5 A/cm$^2$, 0.6 A/cm$^2$, 0.7 A/cm$^2$, 0.8 A/cm$^2$, 0.9 A/cm2, 1.0 A/cm$^2$ or greater. The power for the source of electric current may be any power source or combination of power sources, including electrical power sources, solar power sources and the like.

The source of heat (not shown) can be any source of heat that increases the temperature within the case 12 to a temperature that causes the electrolyte media 21 to transition to a molten phase. For example, the source of heat can achieve a temperature within the case 12 of between about 500° C. and about 850° C. or higher. In some embodiments of the present disclosure, the heating achieves a temperature between about 700° C. and about 800° C., between about 720° C. and about 790° C., or between about 750° C. and about 780° C. In some embodiments of the present disclosure, the heating achieves a temperature of 749-750° C., 751-752° C., 753-754° C., 755-756° C., 757-758° C., 759-760° C., 761-762° C., 763-764° C., 765-766° C., 767-768° C., 769-770° C., 771-772° C., 773-774° C., 775-776° C., 777-778° C., or 779-780° C. In some embodiments of the present disclosure, the temperature within the case 12 can be increased to about 800° C. or hotter. In some embodiments of the present disclosure, the source of heat is provided by, or is supplemented by, the exothermic reaction of $CO_2$ absorption and conversion to carbonate (mass transfer from the gas phase to the solid phase CNM product), or an over potential of applied electrolysis current.

In some embodiments of the present disclosure, the electrolyte media may comprise a carbonate that can be heated by the heat source until it transitions to a molten phase. For example, the carbonate may be a lithium carbonate or lithiated carbonate. Molten carbonates, such as a lithium carbonate ($Li_2CO_3$), which has a melting point of 723° C., or lower melting point carbonates such as $LiBaCaCO_3$, having a melting point of 620° C., when containing oxide includes spontaneous oxide formation that occurs upon melting, or that is a result of electrolysis or when mixed with highly soluble oxides, such as $Li_2O$, $Na_2O$ and $BaO$, sustain rapid absorption of $CO_2$ from the space above the molten electrolyte media. Suitable carbonates may include alkali carbonates and alkali earth carbonates. Alkali carbonates may include lithium, sodium, potassium, rubidium, cesium, or francium carbonates, or mixtures thereof. Alkali earth carbonates may include beryllium, magnesium, calcium, strontium, barium, or radium carbonates, or mixtures thereof. In some embodiments of the present disclosure, the electrolyte can be a mixed composition for example, a mix of alkali carbonates and alkali earth carbonates and one or more of an oxide, a borate, a sulfate, a nitrate, a chloride, a chlorate or a phosphate.

The embodiments of the present disclosure relate to providing the thermal insulator 22 between the plenum D that contains the input gas mixture and inside the case 12 that houses the molten electrolyte media 21. The thermal insulator 22 is configured to facilitate the net selective passage of $CO_2$ therethrough from a first side 22C to and out a second side 22D. Other gases are inhibited from having a net selective passage through the thermal insulator as there is sink, no affinity for their consumption, in the higher temperature media. In some embodiments of the present disclosure, the thermal insulator 22 is made from a material that facilitates the flow of $CO_2$ therethrough and that contributes towards maintaining the temperature within the insulated housing 20. In some embodiments of the present disclosure, the thermal insulator 22 material has: (i) an open pore structure; (ii) a high insulation factor; and (iii) it can withstand the high temperatures achieved within the case 22 and the insulated housing 20, as applicable. Non-limiting examples of suitable materials for the thermal insulator 22 include those capable of withstanding the high temperature (>1150° C.) such as: alumina silicate and alumina calcium silicate blankets. Examples of readily available materials for use as the thermal insulator 22 include, but are not limited to: fibrous or granular forms of permeable batts, mats or blankets; flexible or rigid boards or panels; and, permeable rigid blocks or bricks that permit passage of gas therethrough. Some insulator products used in construction may also be suitable for use as the thermal insulator 22 include, but are not limited to: low and mid-temperature insulation (used in outer walls) such as fiberglass, cellulose, cotton or woven fabrics; mid—temperature insulation (used in outer or middle walls) such as mineral wool; and, high-temperature insulation (used in outer, mid or inner walls) cements and ceramics such as aluminates (including carbonates), silicates (including calcium alumina silicates), derivatives thereof and combinations thereof. Examples of various readily available and suitable high-temperature ceramic products include, but are not limited to; "ceramic fiber insulation for furnaces"; "alumina silica ceramic fiber"; "Durablanket®"; "Cerablanket®" or "Superwool®". Suitable insulator products may have similar compositions (for example about 46% $Al_2O_3$ and about 54% $Si_2O$), thicknesses (0.5", 1" or 2" thick), and a range of densities (4 $lbs/ft^3$=pcf, 6 pcf or 8 pcf).

Figure 8:
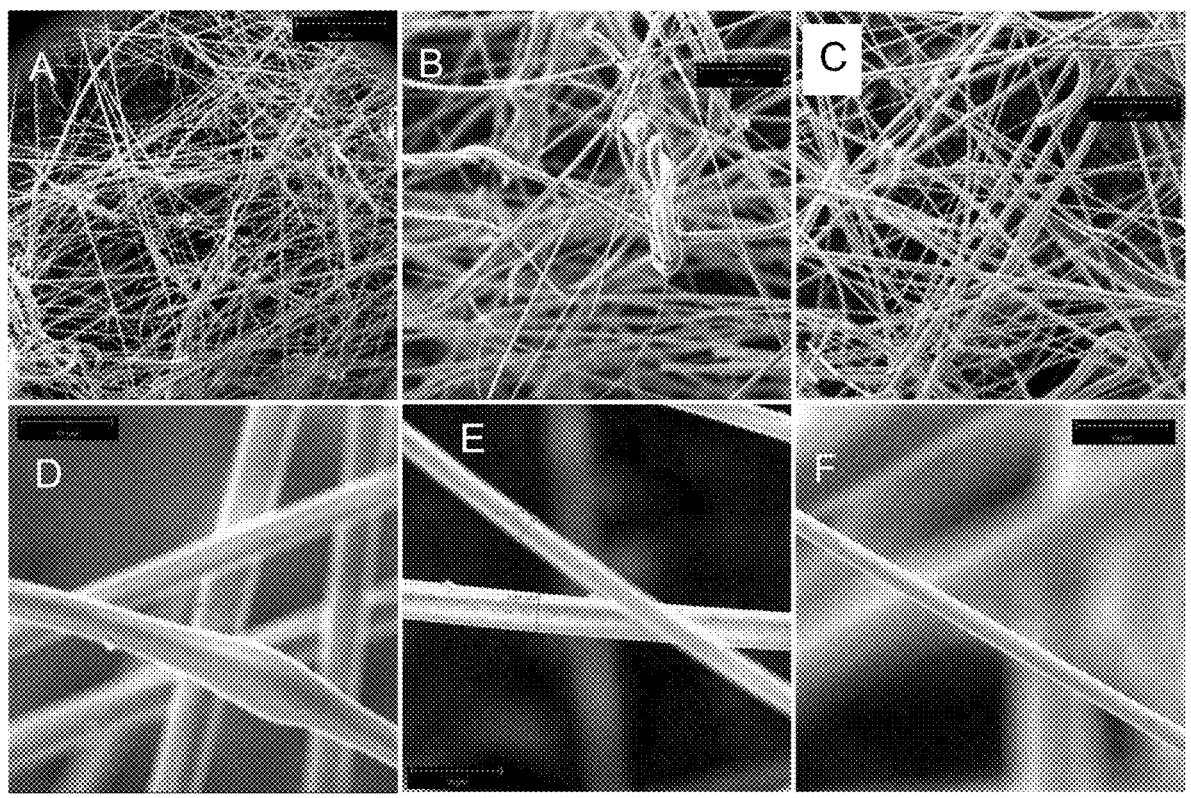
FIG. 8 shows scanning electron microscope (SEM) images of a first material for use as a thermal insulator according to embodiments of the present disclosure, wherein panel A has a scale bar of 300 μm, panel B has a scale bar of 100 μm, panel C has a scale bar of 100 μm, panel D has a scale bar of 10 μm, panel E has a scale bar of 10 μm and panel F has a scale bar of 10 μm.
Figure 9:
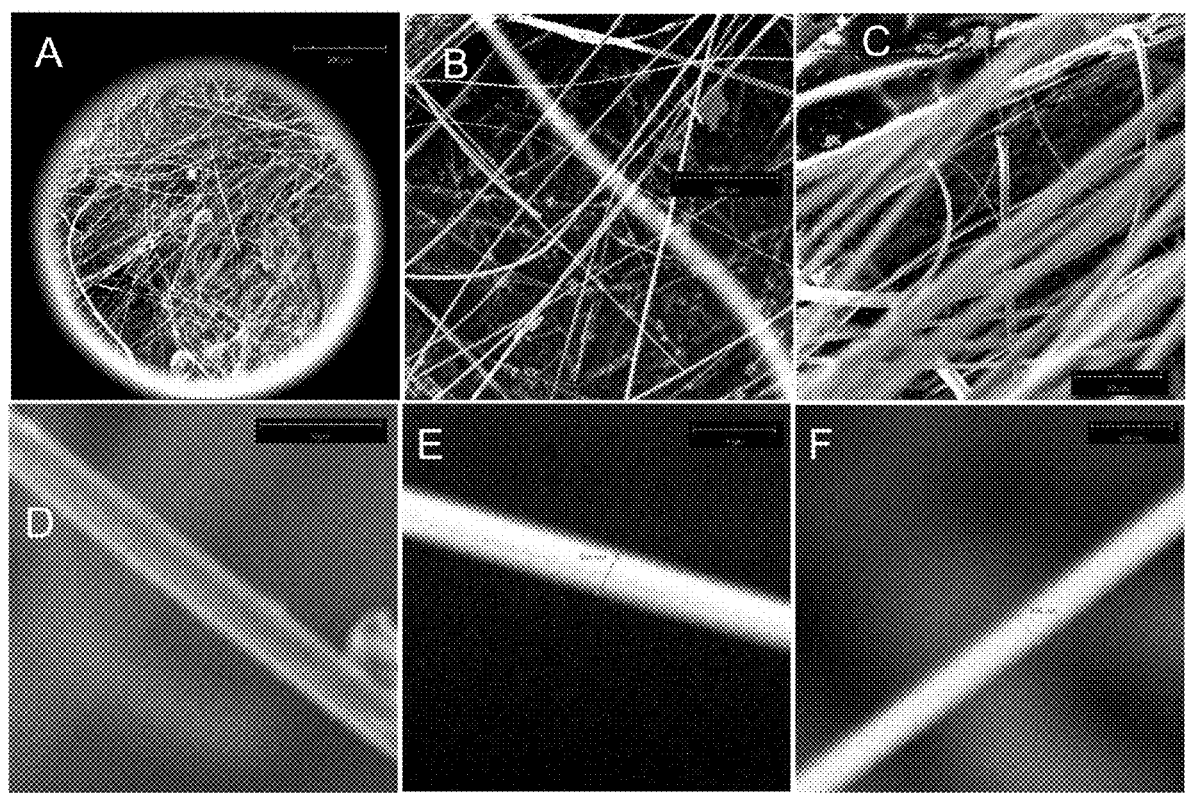
FIG. 9 shows SEM images of a second material for use as a thermal insulator according to embodiments of the present disclosure, wherein panel A has a scale bar of 500 μm, panel B has a scale bar of 100 μm, panel C has a scale bar of 20 μm, panel D has a scale bar of 5 μm, panel E has a scale bar of 1 μm, and panel F has a scale bar of 500 nm.

Even the densest of alumina silica fiber material can be lightweight with a high porosity. As an example, the porosity of the 8 pcf density (=0.128 $g/cm^3$) Cerablanket® may be estimated using the solid (pore free) average $d_{solid}$=3.2 $g/cm^3$ density from 46% of the 4.0 $g/cm^3$ density alumina and 54% of the 2.6 $g/cm^3$ density $Si_2O$. The porosity is estimated from the open space as (with $d_{air}$=0.001225 $g/cm^3$)): $p = 100\% \times (d_{solid} - d_{cerablanket})/(d_{solid} - d_{air})$ with $d_{air}$=0.001225 $g/cm^3$, (alumina silicate 8 pcf, example) =96% (open air pores). A readily available alumina silica fiber that is 2" thick, 8 pcf, thermal fiber blanket that has rated insulation values respectively at 0° C. (extrapolated), 200° C., 400° C., 600° C. and 800° C. of k and (R) of 0.028 (10), 0.05 (5.7), 0.08 (3.6), 0.19 (2.2) NS 0.20 (1.4), for average thermal coefficients over the temperature range from $T_{electrolysis}$ to $T_{air}$ of k=0.52 W/(mK) (and R=3.8 $ft^2$ hr F.° $Btu^{-1}$). A mathematical convenience of the "R" expression of thermal resistance is approximate additivity with insulation layers. Hence, an 8", rather than 2", thickness of this insulator will have an R value of approximately 15.2 $ft^2$ hr F.° $Btu^{-1}$. The porosity and spacing between the insulating fibers are evident in the Scanning Electron Microscopy of a first material, Durablanket®, and a second material, Superwool®, each shown respectively in FIG. 8 and FIG. 9. FIG. 8 shows that the first material has fibers with diameters of about 5.8 µm (panel D), 4.4 µm (panel E) and 3.3 µm (panel E). FIG. 9 shows that the second material has fibers with diameters of about 2.5 µm (panel D), 0.49 µm (panel E) and 0.24 µm (panel F).

In some embodiments of the present disclosure, the surface area of the thermal insulator 22 is between 1 and 100 times greater than the surface area of the upper surface 21A of the molten electrolyte media 21. In some embodiments of the present disclosure, the surface area of the thermal insulator 22 is between 2 and 20 times greater than the surface area of the upper surface 21A of the molten electrolyte media 21. In some embodiments of the present disclosure, in order to maximize net inward $CO_2$ diffusion and minimize outward heat flow, the surface area of the thermal insulator 22 is larger on the outside (the first surface 22C), facing the input gas mixture, than on the inside (the second surface 22D) exposed to the higher temperature media.

In some embodiments of the present disclosure, the density and/or thickness of the thermal insulator may be subjected to a modification process to use with the embodiments of the present disclosure. For example, the thermal insulator may be compressed, or modified by other simple mechanical, chemical or structural means to in order to alter, increase or decrease the net passage of the carbon-containing gas through the thermal insulator, as compared to the unmodified thermal insulator.

FIG. 5B shows an apparatus 10B, according to embodiments of the present disclosure. The apparatus 10B has many similar or the same features as the apparatus 10 described above. The primary difference between the two apparatus 10, 10B is that apparatus 10B has a frame 22A with one or more walls and a ceiling made of the thermal insulator 22 that defines an insulated plenum C, which contains $CO_2$ captured from the input gas mixture in the plenum D outside of the frame 22A. These walls and ceiling of the frame 22A increase the surface area of interaction between the input gas and the porous thermal insulator which can increase the rate of net $CO_2$ diffusion inward (passage through the thermal insulator from the first surface 22C to the second surface 22D). Plenum A may be in fluid communication with the insulated plenum C, as shown in FIG. 5B, or not. Each wall and the ceiling of the frame 22A was made up of a 20 cm×20 cm and 2" thick section of the thermal insulator 22. The second surface 22D of the thermal insulator 22 is spaced apart a predetermined distance from the upper surface 21A of the molten electrolyte media 21, based upon the size of the frame 22A and the volume of molten electrolyte media 21 within the cell 12. As such, changing the size of the frame 22A can increase or decrease the predetermined distance as can increasing or decreasing the volume of molten electrolyte media 21 within the cell 12. The concentration of $CO_2$ within the insulated plenum C may be higher than in the input gas mixture in the plenum D. Furthermore, the CO2 containing gas within the insulated plenum C may also be at a higher temperature than the input gas mixture in the plenum D.

FIG. 5C shows an apparatus 10C, according to embodiments of the present disclosure. The apparatus 10C has many similar or the same features as the apparatus 10B described above. The primary difference between the two apparatus 10B, 10C is that apparatus 10C further includes a housing 24 that defines the plenum D in which a frame 22B is positioned. The housing 24 may be constructed of a material that is substantially impermeable to gas and with low thermal-conductive properties, for example fire brick. In other words, the housing 24 can be made of materials with thermal insulator properties. The housing 24 may define two apertures, an input aperture 26A at a first end and an output aperture 26B at a second end so that a flow of gas within plenum D moves into the housing 24 from input aperture 26A and exits the housing 24 via output aperture 26B. The gas content of plenum D may be substantially the same inside the housing 24 as outside. As with apparatus 10B, due to the thermal insulator 22, the gas content and properties within plenum D is different from the gas content and properties within the insulated plenum C due to the carbon-containing gas that moves, on a net basis, from plenum D through the thermal insulator 22 into plenum C and selectively into the media 21 through interface 21A. The plenum C may have a higher temperature than plenum D. Optionally, the housing 24 may also include one or more shiftable members that can shift their position depending on whether the input gas mixture is entering the housing via the input aperture 26A or the output aperture 26B, such as when the direction of wind travel changes, or otherwise. The shiftable members may be sliding doors, ports, baffles or any other mechanism that are configured to shift their position in order to change the direction that the input gas mixture is moving through the housing 24. The shiftable members may also be configured to shift their position in order to change the direction that the input gas mixture is moving through the housing 24. Additionally or alternatively, the shiftable members may shift based upon a hot spot arising within any apparatus described herein so that the input gas mixture is directed towards or away from the hot spot. As shown, plenum C is in fluid communication with the upper surface 21A of the electrolyte media 21 within the cell 12. In some embodiments of the present disclosure, the apparatus may comprise a convoluted channel between the first surface 22C and the second surface 22D for increasing the contact path length, and therefore the contact time, of the input gas mixture with the thermal insulator 22.

The frame 22B shown in FIG. 5C may have one or more walls made of the thermal insulator 22, for example a 20 cm×20 cm and 4" thick section of thermal insulator 22 and a ceiling that is the same as the frame 22A.

The apparatus 10A may also be configured to establish a gas pressure differential between the electrolysis space B, above the upper surface 21A, and the plenum D. The gas pressure within the cell 12 may be lower than within the plenum D so that the established gas pressure differential may enhance the flow rate of carbon-containing gas through the thermal insulator 22 and into the cell 12. The pressure differential may be caused by various mechanisms, such as a diaphragm pump that decreases the relative gas pressure within the cell 12 as compared to the plenum D. Alternatively, or additionally, a blower or fan may also be used to increase the gas pressure within the plenum D.

In some embodiments of the present disclosure, the apparatus 10B and 10C are configured to establish a gas pressure differential between the plenum D and the plenum C, so as to enhance the movement of carbon-containing gases through the thermal insulator 22 into the plenum C. For example, the gas within the plenum D may be pressurized to a level greater than the gas pressure within the plenum C. A diaphragm pump, blower or fan can be used to facilitate establishing this gas pressure differential between the plenum D and the plenum C.

In some embodiments of the present disclosure, the cell 12 may be configured to cause mixing of the gas present between the inner surface 22C of the thermal insulator 22 and the upper surface 21A of the molten electrolyte media 21. For example, the cell 12 may include one or more mechanisms for mechanical mixing, agitation, stirring, convection, bubbling or a combination thereof to facilitate mixing of the gas above the upper surface 21A and the electrolyte media 21.

In some embodiments of the present disclosure, the apparatus 10A, 10B and 10C may further comprise a mechanism for concentrating the input gas mixture. For example, the apparatus 10A, 10B and 10C may further comprise a vortex tube, a heat pump or a heat engine in order to increase the concentration of carbon-containing gases within the input gas mixture.

Some embodiments of the present disclosure relate to one or more systems that are configured to selectively capture carbon-containing gases from an input gas mixture and then to generate a CNM product from the captured gas. FIG. 6 shows two examples of systems according to the embodiments of the present disclosure. FIG. 6A shows a non-limiting example of a system 200A comprising at least two apparatus 10D and a component 10E. The apparatus 10D represents any apparatus—including apparatus 10A, 10B, 10C and combinations thereof—that is configured to selectively capture $CO_2$ from an input gas mixture and generate a CNM product therefrom using an electrolysis process. The component 10E represents a source of heat and source of power for providing electrical current to the apparatus 10D. While FIG. 6A shows three apparatus 10D, it is understood that there may be more or less individual apparatus 10D that form part of the system 200A. Such apparatus 10D may share an individual component 10E or there may be more than one component 10E in the system 200A.

FIG. 6B shows a non-limiting example of a system 200B comprising at least two apparatus 10D with one apparatus 10D vertically arranged upon another apparatus 10D to form a stack 10F of at least two apparatus 10D. The at least two apparatus 10D may be operatively coupled to the component 10E or there may be more than one component 10E in the system 200B. While FIG. 6B shows one stack 10F, it is understood that the system 200B may include two or more stacks 10F. One or more stacks 10F may be operatively coupled to a given component 10E or each of the one or more stacks 10F may be operatively coupled to a dedicated component 10E.

Some embodiments of the present disclosure relate to one or more methods for selectively capturing carbon-containing gases from an input gas mixture and generating a CNM product from the captured gas. In some embodiments of the present disclosure, the methods described herein may be operated using the apparatus and systems described herein, however, the various embodiments of the method are not limited to such apparatus and systems.

Figure 7B:
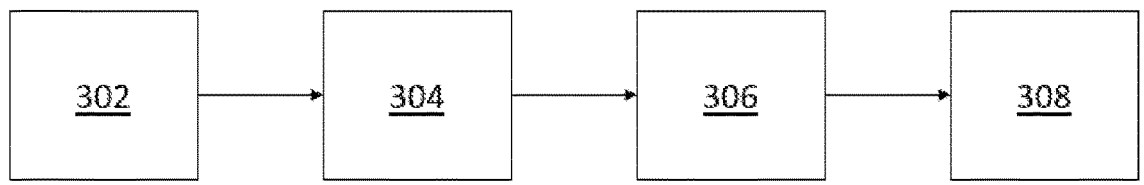

FIG. 7 shows a schematic that represents a method 300 for selectively capturing $CO_2$ from an input gas mixture within a plenum. The method 300 comprises the steps of: establishing fluid communication 302 between the input gas mixture and an outer surface of a porous, thermal insulator and a step of selectively capturing $CO_2$ from the input gas mixture by passing 304 $CO_2$ through the thermal insulator into a second plenum. The method 300 further comprises the step of establishing fluid communication 306 between an inner surface of the porous, thermal insulator and an electrolyte media within the second plenum, wherein the electrolyte media is configured to accentuate capture of $CO_2$. The method 300 further comprises a step of collecting 308 a carbon nanomaterial product generated from the captured $CO_2$ from an electrode within the second plenum. The method 300 may further include an optional step of removing an off-gas product that evolves during the $CO_2$ capture. In some embodiments of the present disclosure, the method 300 further includes a step of selectively removing or adding heat to balance heat generated or required in the capture of the $CO_2$.

According to some embodiments of the present disclosure, the method 300 may further include a step of establishing a gas-pressure differential across the thermal insulator so that the gas pressure of the input gas mixture is higher than the captured gas within the second plenum. The gas pressure differential may be established by use of a diaphragm pump, a blower or a fan. Additionally or alternatively, the input gas mixture may be pressurized so as to establish the gas pressure differential. In some embodiments of the present disclosure, the off-gas generated in the second plenum may be hotter than the temperature of the input gas mixture. In some embodiments of the method, the off-gas product is $O_2$. In some embodiments of the present disclosure, the off-gas product compensates or enhances an input rate of the input gas mixture and/or the selective capture and movement of $CO_2$ into the second plenum. Some embodiments of the method 300 include a step of transferring thermal energy from the off-gas product to the input gas mixture. In some embodiments of the method 300, the porosity of the porous thermal insulator is adjustable so as to change the rate at which $CO_2$ is selectively captured by moving through the thermal insulator and the rate at which heat may transfer through the thermal insulator.

In some embodiments of the method 300, the inner surface of the porous thermal insulator may directly contact the electrolyte media. In other embodiments of the method 300, the method 300 further comprises positioning the inner surface of the porous thermal insulator a predetermined distance from an upper surface of the electrolyte media.

Some embodiments of the present disclosure include a method step of positioning a non-porous outer wall media about the porous thermal insulator for defining an inter-insulation plenum with a first end, a second end and wherein the inter-insulation plenum is configured to receive the input gas mixture at a first end. Optionally, the non-porous outer wall media is also a thermal insulator.

In some embodiments of the present disclosure, the method 300 further comprises a step of using heat generated in the second plenum to heat or power external devices, such as a heat pump or a heat engine is used to heat the input gas mixture, the electrolyte media or a combination thereof. Additionally or alternatively, joule heat, industrial waste heat, solar heat, geothermal heat, exhaust heat or a combination thereof, may be used to heat the input gas mixture, the electrolyte media or a combination thereof.

In some embodiments of the present disclosure, the method 300 further comprises a step of mixing the gas content of the second plenum with the electrolyte media via mechanical mixing, agitation, stirring, convection, bubbling or a combination thereof.

In some embodiments of the present disclosure, the method 300 further comprises the steps of: heating an electrolyte to obtain the molten electrolyte media; disposing the molten electrolyte media between an anode and a cathode in an electrolysis cell within the second plenum; selectively heating the $CO_2$ within the input gas mixture with at least the molten electrolyte media; applying an electrical current to the cathode and the anode in the cell for electrolytically splitting the selectively heated $CO_2$; and, collecting the carbon nanomaterial product from the cathode of the cell.

In some embodiments of the present disclosure, the method 300 further comprises a step of generating an $O_2$ product within the molten electrolyte media. Where the $O_2$ product may enhance convective currents within the molten electrolyte media for mixing the molten electrolyte media.

In some embodiments of the present disclosure, the CNM product of the method 300 comprises carbon nanotubes, carbon nano-onions, nanoflowers, nanotrees, nanobelt, platelets, nano-scaffolds, helices, graphene, doped carbon nanomaterials, magnetic carbon nanomaterials, amorphous carbon or a combination thereof. In some embodiments of the present disclosure, the method 300 further comprises a step of selecting a relative amount of the constituent carbon nanostructures within the CNM product by changing the electrolyte media temperature, $CO_2$ rate, current, voltage, cathode composition, anode composition or electrolyte media composition.

As used herein, the term "selecting a relative amount of the constituent carbon nanostructures within the CNM product" refers to any step that contributes to controlling the morphology of the electrosynthesis CNM product. In some embodiments of the present disclosure, the selected morphology of the CNM may include the following CNM morphologies: carbon nano-onions, carbon nano-scaffolds, carbon nano-spheres, carbon-nano-helices, carbon nano-platelets, graphene or combinations thereof. In some embodiments of the present disclosure, the step of selecting a nanomaterial morphology can result in an electrosynthesis CNM product that is partially, mostly, substantially all or all of a single CNM morphology. For example, the step of selecting a nanomaterial morphology can produce an electrosynthesis CNM product that is partially, mostly, substantially all or all of one of: carbon nano-onions, carbon nano-scaffolds, carbon nano-spheres, carbon-nano-helices, carbon nano-platelets or graphene.

In some embodiments of the present disclosure, the step of selecting a nanomaterial morphology comprises applying the electrical current to the cathode and anode as an alternating current (AC). For example, an AC electrolysis current may select for a CNM product with a nano-onion morphology.

In another embodiment, the step of selecting the nanomaterial morphology comprises adding ZnO to the molten carbonate electrolyte and applying an AC electrolysis current, which may select for a CNM product with a graphene platelet morphology.

In another embodiment, the step of selecting the nanomaterial morphology comprises adding MgO to the molten carbonate electrolyte and selecting an electrical current for a hollow carbon nano-sphere product.

Transition metal nucleated growth, such as the addition of nickel powder, can lead to clearly observable CNT walls. However, when these nucleation additives are purposely excluded during the synthesis, then the high yield synthesis of carbon nano-onions and graphene is accomplished. These differences in the parameters of the electrosynthesis process are but a few examples of how the electrosynthesis CNM product can be selected for.

In some embodiments of the present disclosure, the method 300 further comprises a step of suppling electrical current to the cell by a non-fossil energy source, including, but not limited to solar, wind, hydroelectric, geothermal, tidal, wave, nuclear power or combinations thereof.

In some embodiments of the present disclosure, the method 300 further comprises one or more steps of activating the molten electrolyte media, by pre-heating the electrolyte media, adding an oxide to the electrolyte media, re-using the electrolyte media for multiple electrolysis processes and time equilibrating the molten electrolyte media.

EXAMPLES

The examples and experiments described below relate to direct capture of $CO_2$ from an input gas mixture, by a selective net passage of $CO_2$ through a porous thermal insulator and the generation of a CNM product from the captured $CO_2$. Without being bound by any particular theory, the selective net passage of $CO_2$ is due, at least in part, to an affinity of a media for carbon that may be higher than an affinity of the media for the other constituent gases of the input gas mixture. These examples are offered to illustrate the embodiments of the present disclosure and are not to be construed in any way as limiting the scope of the present disclosure.

Example 1—Passage of $CO_2$ Through Thermal Insulator

Figure 10:
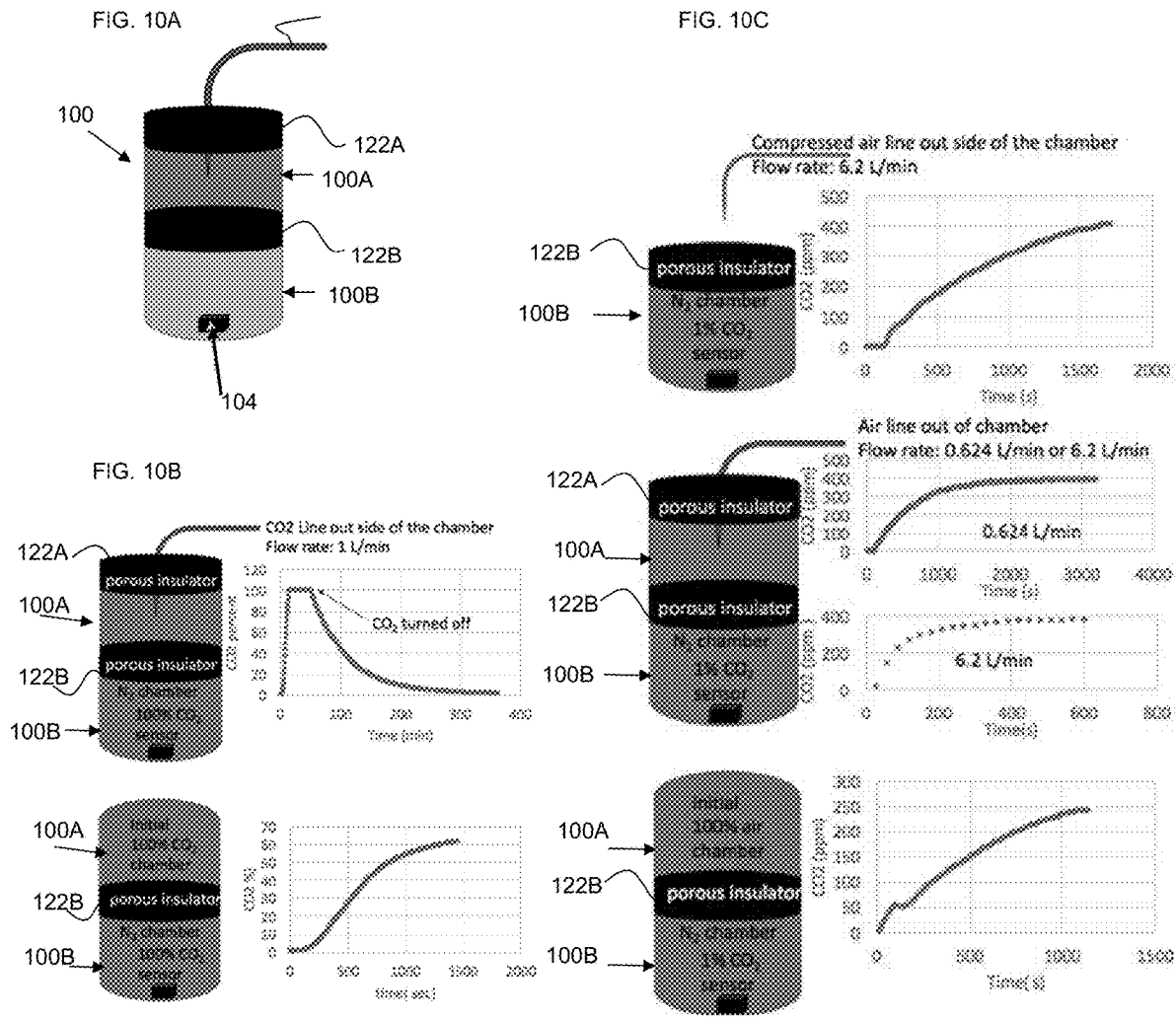

FIG. 10 shows schematics of apparatus configurations and data obtained during experiments that demonstrated the facile flow of $CO_2$ through the thermal insulators of the present disclosure. FIG. 10A shows a fluid tight vessel 100 with about a 4-inch diameter (1-inch equals about 2.54 cm)

that was separated into an upper chamber 100A and a lower chamber 100B by a lower porous, open channel, thermal insulator 122B. Optionally, the upper chamber 100A also included an upper thermal insulator 122A, which was in fluid communication with the air outside the vessel 100. Unless stated otherwise, the thermal insulator 122A and 122B are each a porous thermal insulation separator that is a 2" thick 8 lb per cubic foot density Durablanket®. The upper chamber 100A received an input gas mixture via gas feedline 102. The lower chamber 100B housed a $CO_2$ sensor 104 (such as the type commercially available from CO2meter.com) for measuring and reporting $CO_2$ levels within the lower chamber 1008. The lower chamber 1008 initially contained only pure $N_2$, and no $CO_2$.

FIG. 10B shows two experimental set ups, the set up shown in the upper panel received 100% $CO_2$ into the upper chamber 100A via the feedline 102. In the upper panel of FIG. 10B, the upper chamber 100A included an upper thermal insulator 122A, whereas in the lower panel it does not. The sensor 104 used in the experimental set ups of FIG. 10B was a 0 to 100% sensitivity $CO_2$ sensor. In the lower panel of FIG. 10B, the upper chamber 100A was filled initially with 100% $CO_2$. Each of the upper and lower panels of FIG. 10B each also include a line graph that depicts experimental $CO_2$ levels measured in the lower chamber 1008 over time.

As shown in the upper panel FIG. 10B, when an input gas mixture of pure $CO_2$ is introduced into the upper chamber 100A at a flow rate of 1 L/min, the $CO_2$ concentration in the lower chamber 100B increased from 0 to 100% in about 15 minutes, and when the flow is turned off, the $CO_2$ level gradually diminished. As shown in the lower panel of FIG. 10B, when the upper chamber was filled with 100% $CO_2$, then the $CO_2$ concentration in the lower chamber increased, from 0 to about 62% in about 24 minutes. $CO_2$ is denser than $N_2$, which may drive its increased concentration in the lower chamber 100B compared to the upper chamber 100A. The relative gas density of a mole of $N_2$ to $CO_2$ is given by the ratio of their formula weights of 28/44=63.6%.

FIG. 10C shows three experimental set ups, two of which received compressed air (with a $CO_2$ level of about 418 ppm) at various flow rates via the feed line 102 and a 0 to 1% sensitivity $CO_2$ sensor was used. The upper panel of FIG. 10C shows only a lower chamber 1008, the lower thermal insulator 122B and compressed air was delivered at a rate of 6.2 L/min (equivalent to 330 cm/s wind speed) on top of the thermal insulator 102. As shown in the upper panel of FIG. 10C, the concentration of $CO_2$ in the chamber increased from 0 (pure $N_2$) to about 410 ppm in about 29 minutes.

In the middle panel of FIG. 10C, the experimental set up included an upper thermal insulator 122A, an upper chamber 100A separated from a lower chamber 100B by a lower thermal insulator 122B. The upper line graph of the middle panel of FIG. 10C shows the $CO_2$ levels detected over time in the lower chamber 100A when air was introduced at a rate of 0.624 L/min (equivalent to 33 cm/s wind speed). The bottom chamber $CO_2$ concentration increased from 0 to about 395 ppm in about 45 minutes. The lower line graph of the middle panel of FIG. 10C shows the $CO_2$ levels detected over time in the lower chamber 100A when the air was introduced at a rate of 6.2 L/min. The bottom chamber $CO_2$ concentration increased from 0 to about 395 ppm in about 10 minutes.

Without being bound by any particular theory a thicker, porous insulation layer may slow down the rate of $CO_2$ concentration increases. Interestingly, the opposite was observed to occur. In the same test chamber, the 2" layer of thermal insulator was replaced by 8" (4 stacked 2" layers) of thermal insulator separating the top and lower chambers (not shown). The $CO_2$ from air in the upper compartment reached the 395 ppm level in about 20 minutes or 2.5 minutes respectively at the 0.624 or 6.2 L air/minute flow rates. Without being bound by any particular theory, the observed increase in $CO_2$ concentration in the lower chamber 1006 over a shorter amount of time when the thicker insulator was used may be related to the substantially diminished height of the lower chamber 1006, which decreased the volume of the lower chamber 100B allowing for a more rapid replacement of the original $N_2$.

The lower panel of FIG. 10C shows a further experimental set up where the sealed upper chamber 100A was filled with 100% air, then the $CO_2$ concentration in the lower chamber 100B increased from 0 to about 240 ppm in about 18 minutes.

Without being bound by any particular theory, all of the experimental set ups shown in FIG. 10 demonstrate the passing of $CO_2$, from air or from pure $CO_2$, through a porous, open channeled thermal insulator.

For each of the subsequently described electrolysis processes, the theoretical change in mass before and after the electrolysis, is calculated using:
Q=the measured electrolysis charge applied in units of Amp hours (Ah), and
n=4; equation 2 electrolysis electrons transferred.
F=Faradays constant=96485 c/mol electron=26.801 Ah/mol e⁻. FW(C), FW($O_2$) and FW($CO_2$)=Formula weights carbon, $O_2$, or $CO_2$: 12.01, 32.00, or 44.01 g/mol, respectively.

Example 2—Carbonate Electrolysis in the Absence & Presence of $CO_2$

This experimental demonstration consists of two electrolysis configurations. As shown in FIG. 4A, in a first configuration 400, an electrolysis chamber 402 containing a molten carbonate electrolyte media 404 and electrolysis electrodes 406 was sealed by a sealing member 408. The electrolysis chamber 402 was housed in a housing 405 made of solid, thermal insulation material. No air was allowed into the chamber during the electrolysis, and no additional $CO_2$ was available to renew the carbonate electrolyte media 404 during the electrolysis process. A pressure relief valve allowed for $O_2$ release during the electrolysis process through a pipe 410 that extended below the sealing member 408 and above the housing 405. Without added $CO_2$, consistent with Equation 2, the level of the carbonate electrolyte media decreased within the electrolysis cell 402 during the electrolysis process. The combined measured mass of the electrodes 406 and the electrolyte media 404 was measured before and after passage of the electrolysis charge, and in the absence of $CO_2$ the combined mass was noted to decrease as oxygen evolves.

Specifically, the experiment without $CO_2$ was conducted the configuration 400 was performed (as shown in FIG. 4A) with the following operational parameters:
Case: 4"×6" stainless steel 304 crucible, with the inner walls acting as the anode
Anode/electrode: Nichrome C ~6 cm×6 cm
Cathode/electrode: brass ~6 cm×6 cm
Electrolyte media: $Li_2CO_3$
Temperature: 750° C.
Current: 8.4 Amps (Current density=0.2 A/cm²)
Electrolysis Time: 20 hours The combined mass of the cell, the electrolyte and the electrodes was measured before and after passage of 8.4 Amps×20 hours=168 Ah of electrolysis charge. 168 Ah is capable of reducing 1.567 moles of carbonate as calculated with mass=Q/nF in accordance with Equation 2 using n=4 and F=9.6485×10⁴ As. In the sealed cell of configuration 400, without replacement of the $CO_2$ the sealed cell should lose about 50 g of mass in accordance with Equation 2 due to the loss of $O_2$ as 1.567 mol×32 g $O_2$ mol⁻¹. Subsequent to the electrolysis in the sealed cell, the measured cell mass loss was about 48 g amounting to 96% of the theoretical 50 g loss.

Without being bound to any theory, as oxide builds up in accord with Equation 3, it may be difficult to evolve the last remaining small portion of the $O_2$, for example competitive equilibria may develop combining with $O_2$+oxide or carbonate to develop species that inhibits the continue release of $O_2$.

In a second configuration 400A (shown in FIG. 4B), $CO_2$ from air was allowed to flow into the electrolysis chamber 402 through a porous thermal insulation 412. Specifically, the top of the electrolysis chamber 402 was unsealed and a porous insulator 412, with ten times the surface area of the electrolyte media 404 exposed as an upper surface within the electrolysis chamber 402. The porous top experiment was conducted again using the unsealed configuration 400A (as shown in FIG. 5B), conducted again at a current density of 0.2 A/cm2, having the same type electrodes, and the same 750° C. $Li_2CO_3$ electrolyte media in a stainless steel 304 case as the cell 402. The cover consists of, a 2" thick porous Durablanket® to allow passage of $CO_2$ from the air into the electrolysis cell 402.

Using the unsealed configuration 400A with the porous insulator 412, consistent with Equation 2, which is the summation of Equations 1 and 2, the measured mass of the electrolysis cell 402, the electrodes 406 and carbonate electrolyte media 404 increased as $CO_2$ was absorbed and reacted to renew the electrolyte media 404. From the input $CO_2$, only $O_2$ leaves the system. The electrolytically split $CO_2$ remains as a solid CNM product on the cathode, and evolves as oxygen from the anode. During this electrolysis process the outside of the porous thermal insulation is observed to remain cool, that is near ambient air temperature, and the 48 g cell mass loss subsequent to the electrolysis process performed using the configuration 400 was prevented.

Example 3—Capturing $CO_2$ and Generating CNM Product

Further experiments were performed to investigate capturing $CO_2$ from air and generating a CNM product by splitting of $CO_2$ by electrolysis with a the operational parameters as follows:
  Case: 1.2"×4"×6" stainless steel 304 crucible, with the inner walls acting as the anode
  Cathode/electrode: brass 5 cm×6 cm (2 sides active)
  Electrolyte media: $Li_2CO_3$, electrolyte heated 24 hours prior to electrode immersion
  Temperature: 750° C.
  Current: 2 Amps (Current density=0.04 A/cm²)
  Electrolysis Time: 9 hours
These experiments consisted of measuring the mass of the cell before and after electrolysis. The mass of the cell included the mass of the cell, the electrolyte, and the electrode.

The ambient air temperature varied from 21° C. to 23° C. Masses were measured with a Radwag R Series Precision balance with 0.01 g resolution. The mass of the cell was elevated from the balance platform by thermal insulation, but the balance was heat sensitive accounting for several percent error in experimental mass change.

The theoretical mass gain due to the CNM product is: nF×FW(C) in accord with Equation 2 and 3. This is the same as theoretical cell mass gain for the full cell, including electrodes and electrolyte, only under the condition of the presence of sufficient $CO_2$ to renew all consumed carbonate in accord with Equation 1. The theoretical mass loss due to $O_2$ in accord with Equation 2 is: nF×FW(O2). This is the same as the theoretical cell mass loss only under the condition of the absence of any $CO_2$ to renew the consumed carbonate in accord with Equation 1.

Example 3A

FIG. 5A shows a configuration of an apparatus 10A used in the capture and CNM production experiments described above. The apparatus 10A comprised the cell 12, the anode 16 that formed at least a portion of an inner wall surface of the cell 12 and the cathode 18. The anode 16 and cathode 18 defined an electrolysis space B in which the electrolyte media 21 was housed in a molten state, thereby defining an upper surface 21A of the electrolyte media 21. The cell 12 was supported upon a base 14 of thermal insulation upon a scale, such as a Radwag R Series Precision balance with 0.01 g resolution, for measuring the cell mass. The cell 12 was housed within the insulated plenum A of the insulated housing 20. The thermal insulator 22 was a 2" thick piece of Durablanket® with a density of 8 pcf. The apparatus 10A was placed in a plenum D of ambient air so that the upper surface 21A was in fluid communication with the plenum D through a portion of the thermal insulator 22.

Electrolysis experiments gauging the relative reaction due to ingress and splitting of $CO_2$ (reaction of Equation 3, from the net of Equation 1 and Equation 2), rather than just carbonate decomposition (Equation 2), may be analyzed compared to all $CO_2$ absorbed (Equation 3), or as all $CO_2$ blocked. The latter resulting in $O_2$ evolution mass loss (Equation 2). This is measured as, $Dm_{cell}$, the change in cell mass before and after the electrolysis.

The extent of the dominance of $CO_2$ splitting compared to carbonate decomposition is expressed here in two different manners. The first, expressed in Equation 9a and Equation 9b, is $Dm_{cell}$ relative to the measured electrolysis charge converted to either carbon ($CO_2$ absorption) or to the negative mass expected from oxygen evolution (carbonate decomposition). The second in Equation 10 measures the percent of $CO_2$ absorbed compared to the $CO_2$ required by the electrolysis. This is given by $Dm_{cell}$ coupled with the maximum $O_2$ loss possible, compared relative to the electrolysis charge converted to carbon plus oxygen ($CO_2$). Equations 4a, 4b and 5 are shown below:

$$DC=100 \times Dm_{cell}/(nF \times FW(C)) \quad \text{(Equation 9a)}$$

$$DO_2=-100 \times Dm_{cell}/(nF \times FW(O_2)) \quad \text{(Equation 9b)}$$

$$DCO_2=100 \times (Dm_{cell}+(nF \times FW(O_2)))/(nF \times FW(CO_2)) \quad \text{(Equation 10)}$$

For the open configuration of apparatus 10A, the expected results were net electrolysis, without sufficient $CO_2$ input, loss of cell mass in accordance with insufficient $CO_2$, see Equation 11:

$$Li_2CO_3 \rightarrow CNM_{product}(y)+Li_2O(y)+O_2\uparrow;$$

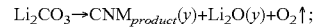

y=stays in cell; ↑=gas leaves cell  (Equation 11)

For the configuration of apparatus 10A, with a minimal portal for $CO_2$ to enter the cell; that is only through a small section of porous insulator whose primary function is to allow the electrolysis off-gas product of $O_2$ to leave the cell; the observed results were a pre-electrolysis cell mass of 2262.50 g and a post-electrolysis cell mass: 2257.50 g. The post-electrolysis mass loss was about 5 g lower than the pre-electrolysis cell mass.

The theoretical mass lost as $O_2$ with minimal $CO_2$ input:

32.00 g mol-1 $O_2 \times 2A \times 9h/4F = 5.37$ g lost (as $O_2$ evolved)

The change in oxygen, $dO_2$, was about 93% (indicating oxygen generation).

The theoretical mass as $CO_2$ is:

44.01 g mol-1 $CO_2 \times 2A \times 9h/4F = 7.38$ g

The change in $CO_2$, $dCO472$, was about 5% (indicating only a small47 absorption of the CO2). Without being bound by any particular theory, the CNM product remained on the cathode with n(e-)=4, but the anode produced $O_2$ that evolved from cell 12.

Example 3B

FIG. 5B shows the second apparatus 10B, which was also used in the capture and CNM production experiments described above. The thermal insulator 22 used was again, a 2" thick piece of Durablanket® with a density of 8 pcf, but now with a larger surface area comprised of walls and a ceiling positioned between the source of the gas input mixture and the electrolyte surface 21A for enhancing the $CO_2$ access to and absorption into the electrolyte media 21. For the apparatus 10B shown in FIG. 5B with the frame 22A, the expected results were net electrolysis, with $CO_2$ diffusing through the thermal insulator causing an increase in cell mass due to at least a partial renewal of carbon within the electrolyte media 21, in accordance with Equations 12, 13 and 14:

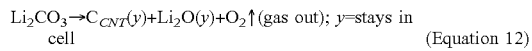 (Equation 12)

 (Equation 13)

 (Equation 14)

For the open configuration of apparatus 10B, with the frame 22A, the observed results were a pre-electrolysis cell mass of 2137.67 g and a post-electrolysis cell mass: 2138.81 g. As opposed to the measured mass loss incurred in Example 3A, this example resulted in a measured mass gain, and the post-electrolysis mass was about 1.14 g higher than the pre-electrolysis cell mass. The theoretical mass gain as C is:

12.01 g mol-1 $C \times 2A \times 9h/4F = 2.01$ g gained (as CNM product)

Compared to the theoretical, the change in carbon, dC, was about 57%.

Furthermore, as compared to theoretical mass of $CO_2$ calculated in Example 3A, the change in $CO_2$, $dCO_2$, was about 88%. Without being bound by any particular theory, the Li2CO3 within the electrolyte media 21 is renewed with carbon from CO2 that remains in cell 12. The CNM product remains on the cathode 18 with n(e-)=4, to account for the increase in cell mass.

Example 3C

FIG. 5C shows the third apparatus 10C, which was used in the capture and CNM production experiments described above. The thermal insulator 22 was a 2" thick piece of Durablanket® with a density of 8 pcf. with an extended surface and now forming a channel for air flow. Net contact of the porous thermal insulator with air and its $CO_2$ can be improved by flowing the air through a channel formed by the solid thermal insulator wall and the inner porous thermal insulator wall. For the apparatus 10C with the housing 24 and the frame 22B, the expected results were net electrolysis, similar to Example 2B.

For the open configuration of apparatus 10C the observed results were a pre-electrolysis cell mass of 2241.13 g and a post-electrolysis cell mass: 2243.16 g. The post-electrolysis mass was about 2.03 g higher than the pre-electrolysis cell mass. The change in change in carbon, dC, was about 101% and the change in $CO_2$, $dCO_2$, was about 100%. Without being bound by any theory, the rate of $CO_2$ diffusion through the thermal insulator increases approximately linearly with decrease in insulator thickness, and insulator increases approximately linearly with decrease in insulator density. Therefore, use of a comparable, but 4 pcf, rather than 8 pcf insulator, with a thickness of 0.5", rather than 2", can increase sustainable current at a high $dCO_2$ to approximately 16 Amps, rather than 2 Amps.

Without being bound by any particular theory, the increased cell mass may have been caused because the $Li_2CO_3$ within the electrolyte media 21 was at least partially renewed by the $CO_2$ drawn into the cell 12 and the carbon from that $CO_2$ remains in the cell 12 for generating the CNM product. The increased cell mass is due to increased CNM product derived from the $CO_2$ within the plenum D, then plenum C and ultimately within the electrolysis space B.

Example 4—Media Activation

The electrolyte media may require activation to initiate consumption of the $CO_2$ captured from the input gas mixture. At 750° C., reaching equilibrium, pure $Li_2CO_3$ equilibrates with about 0.3 molal $Li_2O$ concentration in the $Li_2CO_3$, and there was no measured mass change for pure $Li_2CO_3$ mixed with 0.33 molal $Li_2O$ over a period of 4 hours. Hence, without being bound to any theory, the equilibrium is maintained in accordance with Equation 15:

 (Equation 15)

This consumption may be driven by $CO_2$ moving from the gas phase into the molten lithium carbonate electrolyte media, for example by Equation 1 and electrolytic consumption. Without being bound to any theory, if $CO_2$ is not consumed then in accordance with Equation 2, the electrolyte media is consumed and is not renewed by $CO_2$. The electrolyte media may electrolytically decompose and lose weight as oxygen is evolved in accordance with Equation 2 (rather than in accordance with the net of Equation 1 and Equation 2).

In an example without electrolyte activation, molten $Li_2CO_3$ contained in a high purity alumina ($Al_2O_3$) crucible acted inert to $CO_2$ absorption during electrolysis in the molten electrolyte. Specifically fresh, melted $Li_2CO_3$ exhibited the need to be activated to initiate continuous electrolytic consumption of incident gas phase of $CO_2$ in the air into the molten electrolyte. In an example, molten lithium carbonate open to hot air in a high purity alumina ($Al_2O_3$) crucible is inert to $CO_2$ absorption during electrolysis with or without inclusion of a metal (12.5% cast iron) in the molten electrolyte. Specifically, fresh electrolyte, subsequent to a 4 hour electrolysis at 750° at 0.2 A/cm² between a NiCr C anode and a Muntz brass cathode, displayed a good carbon deposition on the cathode as expected from equation 2, but the total mass of the cell measured before and after the electrolysis decreased, rather than grew as would be expected with sufficient $CO_2$ absorption. The change in $CO_2$ was in accordance with no oxygen absorption or $CO_2$ per carbonate electrolyte renewal shown in Equation 1.

In a repeat 4-hour electrolysis in the cell, while reusing the same electrolyte (which can be considered to in the first stages of equilibration activation) $CO_2$ was marginally absorbed (as measured by $DCO_2$ which rose 3%). This 3% is indicated the start of $CO_2$ continuous activation of the electrolyte, which is incomplete, to renew carbonate during the electrolysis. However, the pure $Li_2CO_3$ electrolyte was substantially activated when the electrolyte was heated at 750° C. for 24 hours (equilibration time) prior to electrode immersion and electrolysis. This activation step increased the change in $CO_2$ to about 81%. Similarly, mixing the $Li_2CO_3$ with sufficient $Li_2O$ (5 wt %) in a stainless steel 304, rather than alumina, crucible without waiting for any equilibration subsequent to electrolysis time increased the change in $CO_2$ to about 99%, indicating nearly complete $CO_2$ absorption, in the fresh molten electrolyte. As with the electrolysis in pure $Li_2CO_3$ without any time equilibration activation, fresh $Li_2CO_3$ mixed with 10 wt % $Na_2CO_3$, or mixed with 3 and 1.3 wt % CaO, displayed no mass-based evidence of $CO_2$ absorption during 4-hour electrolysis. The electrolyte can be modified by metal salt, metal, or other additives to affect both the rate of $CO_2$ absorption and the CNM product Two other examples of electrolyte activated absorption of $CO_2$ are noted here. Reuse of electrolyte, which may provide greater time for electrolyte equilibration presumably leading to an observed increase in $CO_2$ absorption, and specifically subsequent to electrolysis in 750° C. $Li_2CO_3$ with 1 wt % $Li_2O$, the change in $CO_2$ increased from 38% to 91% upon reuse of the electrolyte. Secondly, the upper surface of electrolyte relative to the top of the cell and proximity to the inward flow of $CO_2$ directly relates to the observed measured change in $CO_2$. When the gas phase interacted with electrolysis electrodes immersed in low levels of electrolyte (below the cell top), very low values of changes in $CO_2$ are observed implying a "dead zone" that is depleted in $CO_2$ immediately above the upper surface of the molten electrolyte media. Without being bound to any theory, this dead zone may be related to the flow of gas leaving (rising from the surface) during electrolysis without access to gas phase $CO_2$ during the electrolysis. In one case, this depletion was observed to be so substantial that electrolyte decomposition beyond that attributed to Equation 2, electrolysis evidently occurred and the $CO_2$ concentration was so low above the surface of the electrolyte media that, without being bound to any theory, the carbonate could further decompose in accord with Equation 11. This further carbonate decomposition, may lead to further mass loss and $CO_2$ escape, rather than $CO_2$ use by the electrolyte to generate the CNM product. In this case of electrolysis with low lying electrolyte in the crucible, the change in $CO_2$ was measured at −39%.

Example 5—Modifying Input Gas Flow

Directing or enhancing the input gas flow (for example by directing wind, adding an additional fan, blower, wind lens, wind focus or driving a convection current) over the porous thermal insulator separated from the electrolyte media may also influence the consumption of carbon-containing input gas, such as airborne $CO_2$, by the electrolysis process. Hence, as a related example the configuration used as in FIG. 5C with an electrolyte media that comprised 750° C. $Li_2CO_3$ with 1 wt % $Li_2O$ that was equilibrated for 24 hours in a stainless steel 304 crucible. After which the electrolysis process occurred with air speeds of either 0 m/s, 1.5 m/s, or 2.5 m/s and the change in $CO_2$ was respectively 38%, 89% and 100%. The case of the higher wind speed indicates substantially complete $CO_2$ absorption.

Note in another example, the combined presence of (i) blowing air, (ii) a metal crucible and (iii) a low level of added $Li_2O$ (3⅓ wt %) but using the electrolyte fresh, rather than time equilibrated, still resulted in a relatively low absorption of $CO_2$ of about 8%.

Example 6—Modifying Current Density

The electrolysis current density, $J_{electrolysis}$, also may affect the magnitude of change in $CO_2$. A higher J requires a greater rate of $CO_2$ influx. Hence under the previous conditions, with an incident air speed of 2.5 m/s the $CO_2$ absorption was about 100% when the $J_{electrolysis}$ was 0.042 A/cm$^2$, yet a $CO_2$ absorption of 55% was measured when the $J_{electrolysis}$ was 0.15 A/cm$^2$ with the same air speed.

Example 7—Thermal Insulator Surface Area Increase

The net passage of $CO_2$ through the thermal insulator 22 and the absorption rate of $CO_2$ into the media 21 may be increased by increasing the surface area of the first side 22C of the thermal insulator 22, for example by contouring the first side 22C. Maintaining a substantially flat second side 22D of the thermal insulator 22 may have the additional benefit of minimizing heat flow outward from plenum C. Increasing the surface area of the first side 22C may be accomplished by a wide variety of known contouring techniques, such as but not limited to: macroscopic (geometric), microscopic (surface roughening) and nanoscopic techniques/methods, such as bonding of molecular assemblies to the first side 22C. For example, the active surface area of the first side 22C of the thermal insulator 22 may be increased by adding a layer of "loose fill", blown in fiberglass, borate coated cellulose or ceramic insulation. This layer may be distributed loosely on the first side 22C, and then confined by a flat or shape molded screen to maximize the surface area of the first side 22C.

Figure 11:
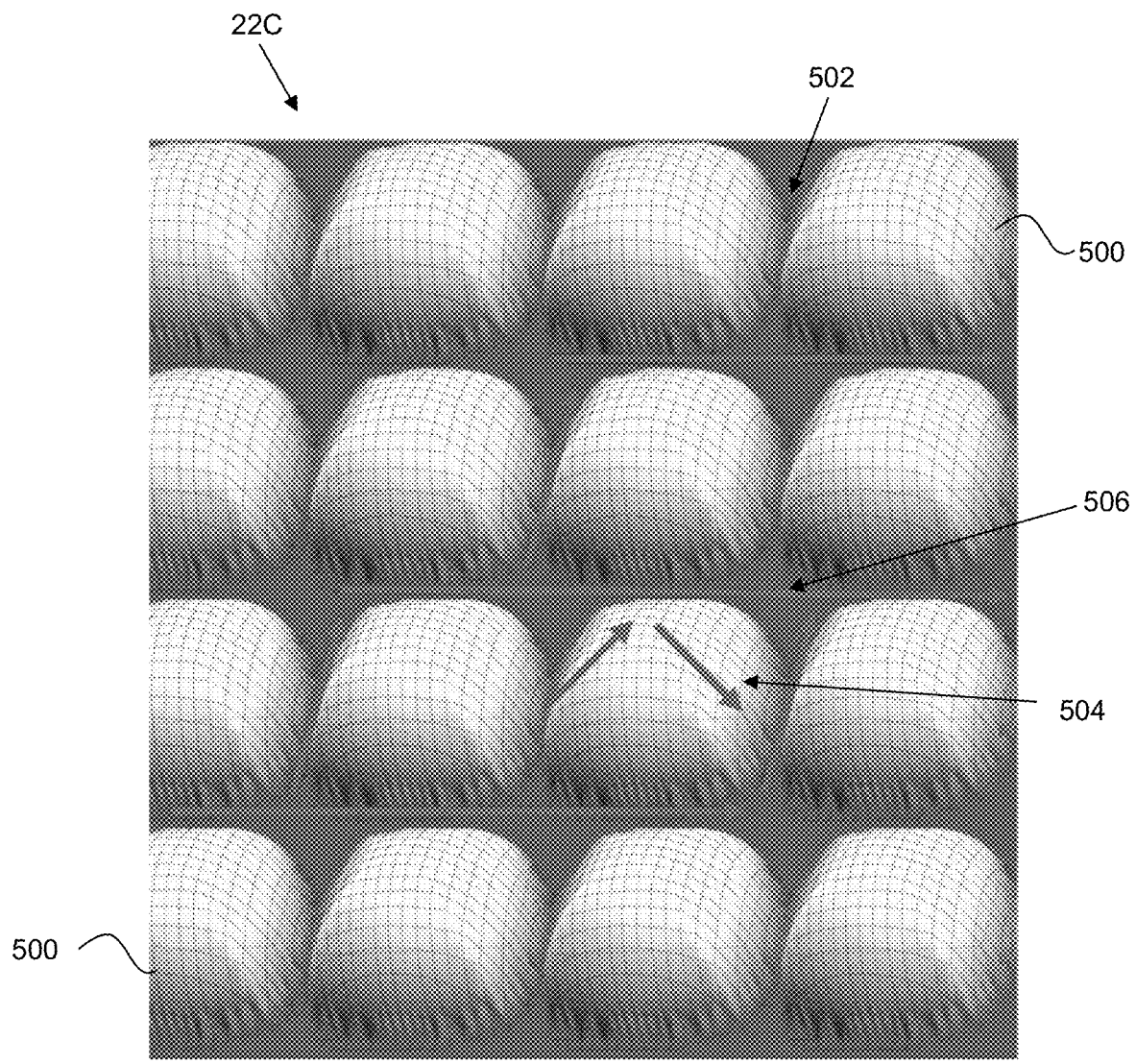
FIG. 11 shows a surface area enhancement to promote net, selective passage of $CO_2$ through the thermal insulator.

Another example of contouring the first side 22C is macroscopic "dimple" surface enhancement. As shown in FIG. 11, the first side 22C may be contoured by various methods to form a plurality of dimples 500, which define between them a plurality of inter-dimple channels 502. While the dimples 500 shown in FIG. 11 are convex, meaning they extend away from the second side 22D, they may also be concave and extend towards the second side 22C, or a combination thereof. The plurality of inter-dimple channels 502 together define a convoluted, inter-dimple flow path 506 along which the input gas mixture can flow. The plurality of dimples 502 also define an over-dimple flow path 508 along which the input gas mixture can flow over a convex or concave dimple—rather than or in addition to flowing within the inter-dimple channels 502, in contact the permeable thermal insulator.

The surface area of the two dimensional first side 22C may also be enhanced by macroscopic, microscopic, or nanoscopic methods. Non-limiting examples of methods for microscopic surface area enhancement include roughening the first side 22C by mechanical, physical, optical, electrical, electrochemical or thermal methods. The microscopic and nanoscopic increase of surface area can also be accomplished by a chemical treatment of the first side 22C, such as chemical deposition on, or chemical reaction, or chemical or electrochemical etching of, the first side 22C.

Without being bound by any particular theory, increasing the surface area of the first side 22C by macroscopic methods, microscopic methods or any combination thereof may increase the net, selective passage of $CO_2$ from the first side 22C to the second side 22D and into the media 21 by providing a chemical affinity, a physical affinity or both for $CO_2$ to enter into the thermal insulator 22. In turn, an increased net passage of $CO_2$ through the thermal insulator 22 may increase the amount and/or rate at which the $CO_2$ is absorbed into the media 21.

Figure 12:
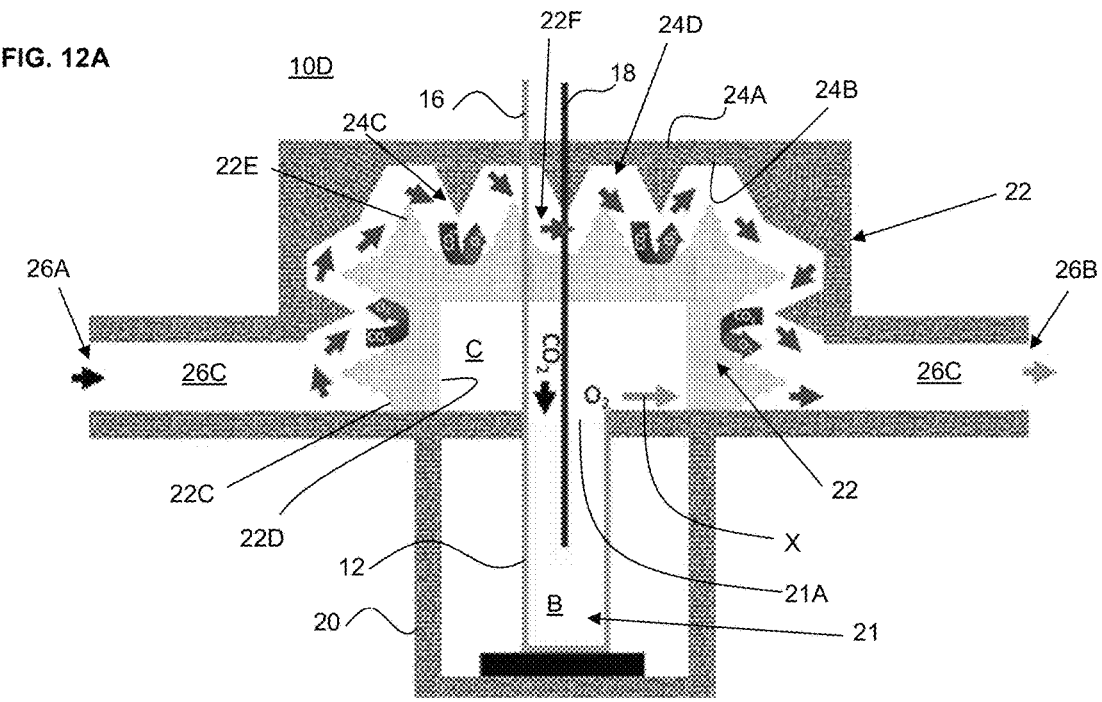
Figure 12:
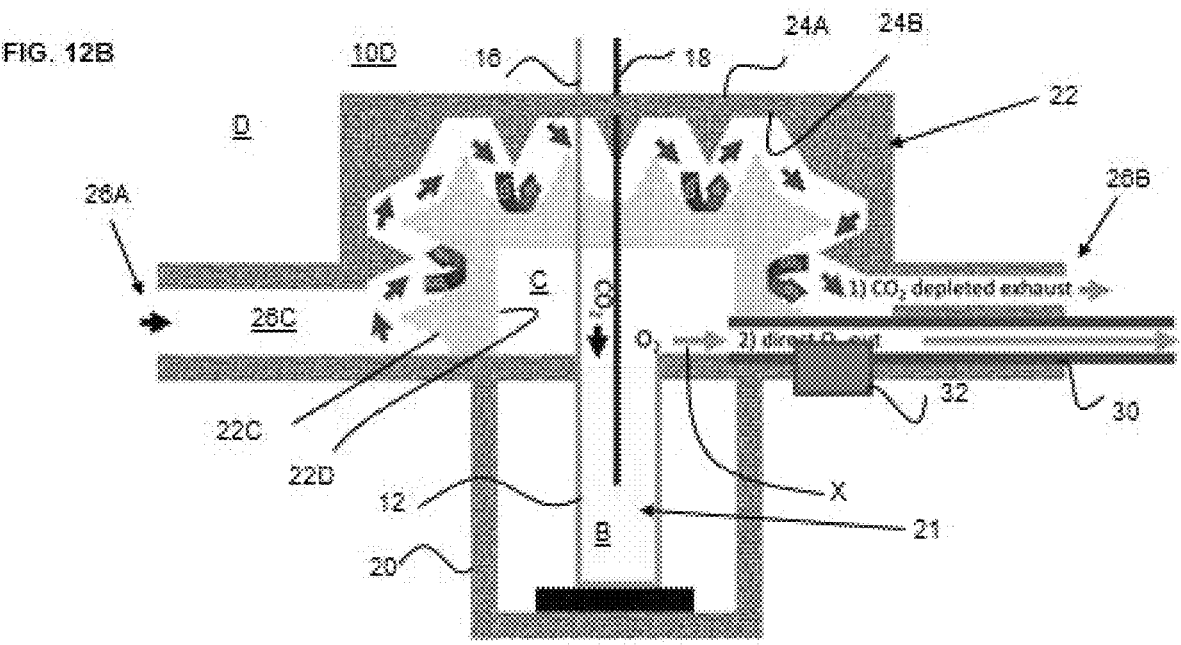

Example 8—Modifying the Flow Channel Between the Thermal Insulator and the Housing FIG. 12A shows an apparatus 10D that has many of the same features as apparatus 10C (shown in FIG. 5C) with apparatus 10D defining an extended/longer path length of a flow channel 26C defined between an inner surface 24B of the housing 24 and the first side 22C of the thermal insulator 24. The housing 24 has an outer surface 24A that may take on various different shapes to facilitate integrating the apparatus into one or more systems described herein. The flow channel 26C starts at the input aperture 26A and ends at the output aperture 26B. As shown in FIG. 12A, the inner surface 24B may define one or more ridges 24C that extend away from the outer surface 24A and towards the first side 22C. The inner surface 24B may also define one or more valleys 24D that extend away from the first side 22C and towards the outer surface 24A.

Additionally or alternatively, the first side 22C of the thermal insulator 22 may define one or more ridges 22E that extend towards the inner surface 24B and away from the second side 22D. The first side 22C may also define one or more valleys 22F that extend away from the inner surface 24B and towards the second side 22D.

The presence of ridges and/or valleys, as defined by the inner surface 24B of the housing 24, the first side 22C of the thermal insulator 22 or both, within the flow channel 26C may enhance the net, selective passage of $CO_2$ through the thermal insulator 22 and into the media 21 by increasing the distance that the input gas mixture flows along the first side 22C. The flow channel 26C may be circuitous causing the flow of the input gas mixture within the flow channel 26C to change direction once or more times as it moves from the input aperture 26A (where the input gas mixture may have substantially the same constituent gases as the input gas mixture at the source) passing over the first side 22C of the thermal insulation 22 to exit by the output aperture 26B (where the gas in the flow channel 26C will be depleted of carbon-containing gas, such as $CO_2$, and optionally supplemented with off-gas generated in the cell 12, such as hot $O_2$. The changes in direction imposed by the circuitous flow channel 26C may induce turbulent flow within the input gas mixture and/or extend the flow path length. Each of turbulent flow and a greater flow path length, as compared to if the first side 22C and the inner surface 24B were substantially flat or smooth, may enhance interaction of the input gas mixture with the first side 22C of the thermal insulator 22 and enhance a net, selective passage of the carbon-containing gas to leave the flow channel 26A and enter into plenum C and ultimately into the media 21. A variety of channels or pathways to maximize this interaction are contemplated herein and the flow channel 26C shown FIG. 12A is not limiting. It is evident to one skilled in the field that the path length for the gas input channel traversing the permeable thermal insulator can be increased, or extended, in a variety of mechanical and geometric configurations. In a further embodiment the input gas mixture can be compressed by a compressor in order to flow across the first side 22C at higher than ambient pressure to facilitate the inward flow of $CO_2$ to the higher temperature media.

FIG. 12A shows the $O_2$ off-gas product of the electrolysis process as forming an exhaust flow (see arrow X in FIG. 12A) that passes from the second side 22D to the first side 22C of the thermal insulator 22 to mix with the $CO_2$ depleted input gas towards the output aperture 26B. Above the surface 21A of the media 21, evolution of the $O_2$ electrolysis off-gas product occurs in the region in proximity to the anode 16, which may facilitate localized collection of this off-gas product. A variety of approaches for collecting of the $O_2$ electrolysis off-gas product and separating it from the input gas mixture can be envisioned by one skilled in the art, and without being limited, one approach for collecting and separating the off-gas product is shown in FIG. 12B.

FIG. 12B shows the exhaust flow of the $O_2$ off-gas product being collected within an exhaust conduit 30 and separated from the $CO_2$ depleted input gas that exits the apparatus 10D by the exhaust aperture 26C. The exhaust conduit 30 provides fluid communication between the plenum C and the plenum D. Alternatively, the exhaust conduit 30 can be coupled to a transport and/or storage system (not shown) for providing fluid communication between the plenum C and a system that facilitates further use of the oxygen off-gas product. The exhaust conduit X can be made of various materials that will withstand the chemical and temperature environment within the plenum C, including the hot off-gas product within the exhaust flow X. In some embodiments of the present disclosure, the exhaust conduit 30 may direct the exhaust flow X of the hot oxygen off-gas product through an optional heat exchanger 32 that can extract some, most, substantially all or all of the thermal energy from the oxygen off-gas product within the exhaust conduit 30. The heat exchanger 32 may transfer the collected thermal energy to the plenum B, the plenum C or both. The benefits of the collection and separation of the hot $O_2$ off-gas product is that; (i) some or all of the heat can be returned to the apparatus via the heat exchanger 32; and (ii) that the high purity $O_2$ product can be directed to various useful industrial and/or oxy-fuel processes. The skilled person will appreciate that use of the exhaust conduit 30 and the optional heat exchanger 32 is not limited to use with apparatus 10D. Collecting and separating the hot exhaust flow can be employed in various of the apparatus described herein, and those apparatus may be used in the various systems and methods described here.

In some embodiments of the present disclosure, the thermal insulator 22 may be modified in order to preferentially or selectively allow a greater flow of the carbon-containing gas therethrough than the other constituent gases of the input gas mixture. For example, the molecular structure of the permeable thermal insulator may be chemically modified to selectively allow the carbon-containing gases to pass more easily therethrough as compared to when the thermal insulator 22 is not so modified, in comparison to the ease of passage of the other non-carbon containing constituent gases or combinations thereof. For example, the thermal insulator 22 may be modified so that certain non-carbon containing gases may absorb or adsorb on to the thermal insulator and, therefore, these non-carbon containing gases do not enter the plenum C to be absorbed by the media 21. In some embodiments of the present disclosure, the thermal insulator may be modified to incorporate molecular sieves that select which gases that are constituents in the input gas mixture can pass through the thermal insulator more easily than other constituent gases.

Without being bound by any particular theory, the Examples above demonstrate the selective capture of $CO_2$ from an input gas mixture and the use of the carbon therein to generate a CNM product. The experiments were observed from start to end, including measurement of the cell mass before and the cell mass after the electrolysis. The calculations were compared with the experiments. The results were validated. The experiments showed the cell can access robust rates without the need to heat up all the input gas mixture. The porous thermal insulator with the high $CO_2$ affinity higher temperature medium allows net selective passage/diffusion of $CO_2$, which is at least one mechanism by which the selective capture of $CO_2$ from the input gas mixture occurred. Surface adsorption and pore size both influenced $CO_2$ diffusion for $CO2/N_2$ mixtures across the porous thermal insulator. The porous structure of the thermal insulator facilitated interaction of the electrolyte media with the captured $CO_2$ gas. The high affinity of the molten electrolyte for $CO_2$ provided net selective transfer from the gas phase above the upper surface of the electrolyte media into the electrolyte media. The experiments and examples described herein demonstrate that the different configurations may influence the extent to which $CO_2$ is absorbed within the cell. Experiments demonstrated configurations and operating conditions where $CO_2$ is depleted and where there is sufficient $CO_2$ from air for the given operation conditions of the cell.

As supported by the equations presented herein above, $CO_2$ may be rapidly absorbed and spontaneously concentrated from the input gas mixture by an exothermic reaction with the electrolyte media through the reaction with oxides in the molten salts of the electrolyte media. The reaction of $CO_2$ with the electrolyte media may continuously renews the carbonate electrolyte media, as described by Equation 1. The experimental results are in-line with the expected mass gain or loss, in accordance with the equations (as described in Section 2). Mass gain of the cell is observed to occur due to carbon built up—in the form of the CNM product—on the cathode, as described by the overall net equation (Equation 3). Hot $O_2$ generated from the electrolysis could also be used. System features that may enhance the degree of $CO_2$ conversion to cathode-associated CNM product during molten carbonate electrolysis include, but are not limited to: increased air or wind speed, using a lower current density, change of the porosity thermal insulation, adjusting the spacing between the thermal insulator and the upper surface of the electrolyte media, activation of the electrolyte by increased equilibration time, electrolyte re-use, increased oxide concentration, positioning the electrolyte media upper surface closer to the inner surface of the thermal insulator, use of a metal electrolysis cell, or a combination of these features.

What is claimed is:

1. A system for selectively transferring a carbon-containing gas from an input gas mixture, the system comprising:
    (a) a thermal insulator that permits net passage therethrough of the carbon-containing gas from the input gas mixture at a first temperature;
    (b) a plenum;
    (c) an anode and cathode positioned within the plenum; and
    (d) a molten electrolyte media, housed within the plenum between the anode and the cathode, the molten electrolyte media at a second temperature that is greater than the first temperature, the molten electrolyte media having a first affinity for carbon within the carbon-containing gas received from the thermal insulator and the molten electrolyte media acts as a carbon sink, wherein the molten electrolyte media defines a surface with a first surface area and wherein the upper surface is in fluid communication with the source of the input gas mixture;
    wherein the thermal insulator facilitates the net passage therethough of the carbon-containing gas to the surface of the molten electrolyte media,
    wherein the system is configured to selectively heat and electrolytically split the carbon-containing gas for generating a different chemical substance, and
    wherein the thermal insulator is positioned between a source of the input gas mixture and the plenum.

2. The system of claim 1, wherein the first affinity for carbon comprises the molten electrolyte media chemically reacting with the carbon-containing gas received from the thermal insulator; electrochemically reacting with the carbon-containing gas received from the thermal insulator; absorbing the carbon-containing gas received from the thermal insulator, binding with the carbon-containing gas received from the thermal insulator or any combination thereof.

3. The system of claim 1, wherein the first affinity for carbon comprises the molten electrolyte media generating a different chemical substance with the carbon-containing gas received from the thermal insulator.

4. The system of claim 2, wherein the first affinity for carbon comprises the molten electrolyte media generating a different chemical substance with the carbon-containing gas received from the thermal insulator.

5. The system of claim 1, wherein the carbon-containing gas is carbon dioxide (CO2).

6. The system of claim 1, wherein the input gas mixture is air, an anthropogenic CO2-containing gas, an industrial waste-gas stream, a gas from a reservoir of sequestered CO2, an emission gas from an industrial plant, an emission gas from a chemical reactor, an emission gas from a power generating plant, an emission gas from a steam generation facility, an emission gas from a pyrolysis reactor, a CO2-containing gas product from combusting a fossil fuel, a CO2-containing gas product from transforming a fossil fuel, a CO2-containing gas product from heating, a CO2-containing gas product from transportation, a CO2-containing gas product from production of a polymer, a CO2-containing gas product from production of a plastic or combinations thereof.

7. The system of claim 1, wherein the thermal insulator is permeable.

8. The system claim 1, wherein the thermal insulator is porous.

9. The system claim 7, wherein the thermal insulator is porous.

10. The system of claim 1, wherein the thermal insulator comprises, fiberglass, cellulose, cotton, a woven textile, a mineral wool, a cement, a carbonate, a calcium aluminate, a calcium silicate, an aluminum silicate, a chemical derivative thereof or any combination thereof.

11. The system of claim 1, wherein the molten electrolyte media has a second affinity for other gas constituents of the input gas mixture.

12. The system of claim 11, wherein the first affinity is greater than the second affinity.

13. The system of claim 1, wherein the first temperature is between about −90° C. and about 75° C.

14. The system of claim 1, wherein the first temperature is between about 50° C. and about 400° C.

15. The system of claim of claim 1, wherein the second temperature is between about 400° C. and about 850° C.

16. The system of claim 1, wherein the carbon-containing gas comprises $CO_2$.

17. The system of claim 1, wherein the first affinity for carbon comprises the molten electrolyte media chemically reacting with the carbon-containing gas received from the thermal insulator; electrochemically reacting with the carbon-containing gas received from the thermal insulator; absorbing the carbon-containing gas received from the thermal insulator, or binding with the carbon-containing gas received from the thermal insulator.

18. The system of claim 16, wherein the different chemical substance is elemental carbon.

19. The system of claim 16, wherein the different chemical substance is nanocarbon.

20. The system of claim 16, wherein the different chemical substance is graphitic nanocarbon.

21. The system of claim 1, wherein the thermal insulator defines a surface area that is between 1 and 100 times greater than the first surface area of the molten electrolyte media.

22. The system of claim 1, wherein the thermal insulator comprises a first side that is adjacent the source of the input gas mixture, wherein the first side has a larger surface area than an opposite second side that is adjacent the molten electrolyte media.

23. The system of claim 22, wherein the first side defines a plurality of dimples.

24. The system of claim 1, wherein the system further comprises a housing that is positioned between the thermal insulator and the source of the input gas mixture, wherein the housing and the thermal insulator define a flow channel for passing the input gas mixture along a first side of the thermal insulator.

25. The system of claim 24, wherein the housing, the thermal insulator or both define one or more ridges, one or more valleys or both for increasing a length of the flow channel.

26. The system of claim 1, further comprising a conduit that provides fluid communication between a source of an exhaust flow of an off-gas product and outside the system.

27. The system of claim 1, wherein a thickness, a density or both of the thermal insulator is modified to increase a rate of net passage of the carbon-containing gas through the thermal insulator.

* * * * *